(12) United States Patent
Kemmochi et al.

(10) Patent No.: US 7,885,613 B2
(45) Date of Patent: Feb. 8, 2011

(54) MULTIBAND HIGH-FREQUENCY CIRCUIT, MULTIBAND HIGH-FREQUENCY CIRCUIT DEVICE AND MULTIBAND COMMUNICATIONS APPARATUS COMPRISING SAME

(75) Inventors: Shigeru Kemmochi, Kumagaya (JP); Kazuhiro Hagiwara, Kumagaya (JP); Keisuke Fukamachi, Kumagaya (JP); Mitsuhiro Watanabe, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 668 days.

(21) Appl. No.: 11/911,349

(22) PCT Filed: Apr. 11, 2006

(86) PCT No.: PCT/JP2006/307670

§ 371 (c)(1),
(2), (4) Date: Oct. 12, 2007

(87) PCT Pub. No.: WO2006/112306

PCT Pub. Date: Oct. 26, 2006

(65) Prior Publication Data

US 2009/0017772 A1    Jan. 15, 2009

(30) Foreign Application Priority Data

Apr. 15, 2005 (JP) .............................. 2005-118312

(51) Int. Cl.
 *H04B 1/44* (2006.01)
(52) U.S. Cl. ...................................... 455/78
(58) Field of Classification Search ........................ None
See application file for complete search history.

(56) References Cited

U.S. PATENT DOCUMENTS

| | | | | |
|---|---|---|---|---|
| 5,815,804 A * | 9/1998 | Newell et al. | .................. | 455/78 |
| 6,563,396 B2 * | 5/2003 | Tanaka et al. | .................. | 455/83 |
| 6,633,748 B1 * | 10/2003 | Watanabe et al. | .............. | 455/78 |
| 6,768,898 B2 * | 7/2004 | Furutani et al. | ................ | 455/82 |
| 6,795,714 B1 * | 9/2004 | Fickenscher et al. | ..... | 455/552.1 |
| 6,912,406 B2 * | 6/2005 | Lahlum et al. | ........... | 455/553.1 |
| 6,975,841 B2 * | 12/2005 | Uriu et al. | ...................... | 455/78 |
| 6,985,712 B2 * | 1/2006 | Yamakawa et al. | .......... | 455/333 |

(Continued)

FOREIGN PATENT DOCUMENTS

JP    2001-024579 A    1/2001

(Continued)

*Primary Examiner*—Matthew D Anderson
*Assistant Examiner*—Gennadiy Tsvey
(74) *Attorney, Agent, or Firm*—Sughrue Mion, PLLC

(57) ABSTRACT

A multiband high-frequency circuit comprising a first switch SPDT1 for switching the connections of a multiband antenna to transmitting circuits 11*bg*-T, 11*a*-T and receiving circuits 11*bg*-R, 11*a*-R of first and second communications systems, and a transmitting/receiving circuit BLT-TR of a third communications system, a diplexer circuit Dip1 for branching a high-frequency signal to 11*a*-R and 11*bg*-R or BLT-TR and a diplexer circuit Dip2 for branching a high-frequency signal to 11*bg*-T and 11*a*-T, both of which are disposed downstream of SPDT1, each diplexer circuit Dip1, Dip2 comprising a lower-frequency-side filter and a high-frequency-side filter, a bandpass filter BPF1 being disposed downstream of the lower-frequency-side filter of the diplexer circuit Dip1, and a second switch SPDT2 being disposed downstream of the bandpass filter BPF1.

11 Claims, 26 Drawing Sheets

U.S. PATENT DOCUMENTS

| | | | |
|---|---|---|---|
| 6,995,630 B2 * | 2/2006 | Satoh et al. | 333/133 |
| 7,027,779 B2 * | 4/2006 | Tai et al. | 455/83 |
| 7,057,472 B2 * | 6/2006 | Fukamachi et al. | 333/101 |
| 7,076,216 B2 * | 7/2006 | Hayashi | 455/78 |
| 7,126,440 B2 * | 10/2006 | Bradley et al. | 455/78 |
| 7,190,970 B2 * | 3/2007 | Ochii et al. | 455/553.1 |
| 7,253,702 B2 * | 8/2007 | Kemmochi et al. | 455/78 |
| 7,295,814 B2 * | 11/2007 | Yamashita et al. | 455/83 |
| 7,328,041 B2 * | 2/2008 | Tasaka | 455/552.1 |
| 7,373,171 B2 * | 5/2008 | Nakai | 455/552.1 |
| 7,376,440 B2 * | 5/2008 | Forrester et al. | 455/553.1 |
| 7,398,059 B2 * | 7/2008 | Uejima et al. | 455/78 |
| 7,471,930 B2 * | 12/2008 | Okuyama et al. | 455/78 |
| 7,518,469 B2 * | 4/2009 | Kemmochi et al. | 333/126 |
| 7,545,759 B2 * | 6/2009 | Hayashi | 455/82 |
| 7,565,116 B2 * | 7/2009 | Okuyama et al. | 455/83 |
| 7,596,357 B2 * | 9/2009 | Nakamata et al. | 455/78 |
| 7,659,795 B2 * | 2/2010 | Hikita et al. | 455/83 |
| 2002/0032038 A1 * | 3/2002 | Furutani et al. | 455/552 |
| 2002/0090974 A1 * | 7/2002 | Hagn | 455/552 |
| 2004/0047306 A1 * | 3/2004 | Katagishi et al. | 370/320 |
| 2004/0185795 A1 * | 9/2004 | Shamsaifar et al. | 455/83 |
| 2004/0266378 A1 | 12/2004 | Fukamachi et al. | |
| 2005/0048927 A1 | 3/2005 | Kemmochi et al. | |
| 2005/0143023 A1 * | 6/2005 | Shih | 455/101 |
| 2005/0245201 A1 * | 11/2005 | Ella et al. | 455/78 |
| 2006/0044080 A1 * | 3/2006 | Hagiwara et al. | 333/195 |
| 2006/0194550 A1 * | 8/2006 | Block et al. | 455/78 |
| 2007/0190954 A1 * | 8/2007 | Murakami et al. | 455/132 |
| 2008/0212552 A1 * | 9/2008 | Fukamachi et al. | 370/343 |

FOREIGN PATENT DOCUMENTS

| | | |
|---|---|---|
| JP | 2002-185356 A | 6/2002 |
| JP | 2003-087023 A | 3/2003 |
| JP | 2003-152588 A | 5/2003 |
| JP | 2004-7408 A | 1/2004 |
| JP | 2004-007408 A | 1/2004 |
| JP | 2004-073193 A | 3/2004 |
| JP | 2004-140696 A | 5/2004 |
| JP | 2004-073193 A | 8/2004 |
| JP | 2005-64779 A | 3/2005 |
| JP | 2005-064779 A | 3/2005 |
| WO | WO 03/092997 A2 | 11/2003 |

* cited by examiner

MULTIBAND HIGH-FREQUENCY CIRCUIT, MULTIBAND HIGH-FREQUENCY CIRCUIT DEVICE AND MULTIBAND COMMUNICATIONS APPARATUS COMPRISING SAME

FIELD OF THE INVENTION

The present invention relates to a wireless communications apparatus for conducting wireless transmission between electronic or electric equipments, and a multiband high-frequency circuit and a multiband high-frequency circuit device used therein, particularly to a multiband high-frequency circuit, a multiband high-frequency device usable in at least three communications systems, and a multiband communications apparatus comprising it.

BACKGROUND OF THE INVENTION

Data communications by wireless LAN (WLAN) such as an IEEE802.11 standard are now widely used. Wireless data transmission is conducted, for instance, among personal computers (PCs), PC peripherals such as printers, hard disk drives and broadband rooters, electronic appliances such as facsimiles, refrigerators, standard television sets (SDTVs), high-definition television sets (HDTVs), digital cameras, videorecorders and cell phones, signal-transmitting means used in automobiles or aircrafts in place of wired communications, etc.

There are now pluralities of standards such as IEEE802.11a, IEEE802.11b, IEEE802.11g, IEEE802.11h, etc. for wireless LAN. IEEE802.11a uses a modulation system of orthogonal frequency division multiplexing (OFDM), supporting high-speed data communications at 54 Mbps at maximum in a 5-GHz frequency band. IEEE802.11h is a standard for enabling IEEE802.11a in Europe. IEEE802.11b uses a system of direct sequence spread spectrum (DSSS), supporting high-speed communications at 5.5 Mbps and 11 Mbps in an industrial, scientific and medical (ISM) band of 2.4 GHz freely usable without wireless license. IEEE802.11g uses the OFDM modulation system, supporting high-speed data communications at 54 Mbps at maximum in a 2.4-GHz-band like IEEE802.11b.

Also proposed is an extremely convenient, short-distance wireless standard, Bluetooth™, which uses a 2.4-GHz ISM band like IEEE802.11b and IEEE802.11g and can connect associated electronic appliances without a cable. Bluetooth uses a frequency-hopping system with excellent noise resistance, in which a 2.4-GHz ISM frequency band is divided to pluralities of wireless channels, and each wireless channel is divided to time slots every unit time ($1/1600$ seconds), wireless channels used being changed every time slot.

Wireless LAN used by a small group within a distance of about 50-100 m has as high a data-transmitting speed as several Mbps to several tens of Mbps, consuming the power of about 100 mW. On the other hand, Bluetooth is expected to be used in a relatively narrow area within an electromagnetic-wave-reaching-distance of about 10 m, as in the same compound or building, etc., so that it is designed to consume as small power as about 10 mW with a transmission speed of at most 2 Mbps. Because the wireless LAN and Bluetooth are different in a transmission speed, a transmissible range, etc., they can be included in one communications apparatus for selective use depending on applications. Accordingly, high-frequency circuits and high-frequency communications apparatuses will be explained, with IEEE802.11b and IEEE802.11g of wireless LAN as a first communications system, IEEE802.11a and IEEE802.11h of wireless LAN as a second communications system, and Bluetooth as a third communications system for convenience.

JP2001-24579 A discloses a circuit usable for both wireless LAN (IEEE802.11b and/or IEEE802.11g using 2.4 GHz) and Bluetooth. This circuit comprises, as shown in FIG. 34, a first high-frequency switch circuit (SwA) for switching the connections of a first antenna port (AP1) to a transmitting circuit (WLAN TX) of a first communications system and a second high-frequency switch circuit (SwB), the second high-frequency switch circuit (SwB) for switching the connections of a receiving circuit (WLAN RX) of a first communications system to the first high-frequency switch circuit (SwA) and a third high-frequency switch circuit (SwC), and the third high-frequency switch circuit (SwC) for switching the connections of a second antenna port (AP2) to a transmitting/receiving circuit (BT TX/RX) of a second communications system and the second high-frequency switch circuit (SwB), a second filter (FL2) being disposed between the first high-frequency switch circuit (SwA) and the transmitting circuit (WLAN TX) of the first communications system, and a first filter (FL1) being disposed between the second high-frequency switch circuit (SwB) and the receiving circuit (WLAN RX) of the first communications system.

WO03/092997 A discloses a circuit using IEEE802.11b and/or IEEE802.11g using a 2.4-GHz band of wireless LAN, and IEEE802.11a and/or IEEE802.11h using a 5-GHz band of wireless LAN. This circuit comprises a high-frequency switch circuit for switching the paths of a first antenna port (second antenna port) to transmitting circuits of first and third communications systems and receiving circuits of first and third communications systems; a first diplexer circuit connected to a receiving circuit port of the high-frequency switch circuit for branching a high-frequency signal to the receiving circuit of the first communications system and the receiving circuit of the third communications system depending on the frequency bands of the communications systems; a high-frequency filter and a low-noise amplifier connected to a lower-frequency port of the first diplexer circuit; a high-frequency filter and a low-noise amplifier connected to a higher-frequency port of the first diplexer circuit; a second diplexer circuit connected to a transmitting circuit port of the first high-frequency switch circuit for branching a high-frequency signal to the transmitting circuit of the first communications system and the transmitting circuit of the third communications system depending on the frequency bands of the communications systems; a high-frequency filter and a high-frequency power amplifier connected to a lower-frequency port of the second diplexer circuit; and a high-frequency filter and a high-frequency power amplifier connected to a higher-frequency port of the second diplexer circuit.

JP2003-87023 A discloses a circuit usable for Bluetooth and IEEE802.11a and/or IEEE802.11h using a 5-GHz band of wireless LAN. This circuit comprises, as shown in FIG. 35, a first high-frequency switch circuit 3 for switching the paths of a first antenna 8 to a transmitting circuit 1 of a second system and a diversity switch 4, and the diversity switch 4 for switching the paths of a receiving circuit 2 of the second system to the first high-frequency switch circuit 3 and a first bandpass filter 6 having a passband equal to the frequency band of the second system, the first bandpass filter 6 being disposed between a second multiband antenna 9 and the diversity switch 4, and a second bandpass filter 7 having a passband equal to the frequency band of a third system being disposed between the second multiband antenna 9 and a transmitting/receiving circuit 5 of a third system.

As described above, the circuit usable commonly for IEEE802.11b and/or IEEE802.11g using a 2.4-GHz band of wireless LAN and Bluetooth, the circuit usable commonly for IEEE802.11b and/or IEEE802.11g using a 2.4-GHz band of wireless LAN and IEEE802.11a and/or IEEE802.11h using a 5-GHz band of wireless LAN, and the circuit usable commonly for Bluetooth and IEEE802.11a and/or IEEE802.11h using a 5-GHz band of wireless LAN were proposed, but these circuits are adapted to two communications systems, but not usable for three communications systems including IEEE802.11b and/or IEEE802.11g using a 2.4-GHz band of wireless LAN, Bluetooth, and IEEE802.11a and/or IEEE802.11h using a 5-GHz band of wireless LAN.

OBJECTS OF THE INVENTION

Accordingly, an object of the present invention is to provide a high-frequency circuit usable in at least three communications systems, for instance, in IEEE802.11b and/or IEEE802.11g using a 2.4-GHz-band of wireless LAN, Bluetooth, and IEEE802.11a and/or IEEE802.11h using a 5-GHz band of wireless LAN.

Another object of the present invention is to provide a multiband high-frequency circuit device with a small number of parts and capable of being miniaturized.

A further object of the present invention is to provide a multiband communications apparatus comprising such high-frequency circuit device.

DISCLOSURE OF THE INVENTION

The first multiband high-frequency circuit of the present invention, which is used between an antenna capable of conducting transmission and reception in at least three communications systems, and transmitting and receiving circuits of at least three communications systems, comprises a first high-frequency switch circuit for switching the connections of the antenna to first and second paths, a first diplexer circuit disposed in the first path, and a second diplexer circuit disposed in the second path; each of the first and second diplexer circuits comprising a lower-frequency-side filter circuit and a higher-frequency-side filter circuit; a path connected to the lower-frequency-side filter circuit of the first diplexer circuit being provided with a bandpass filter circuit, and a second high-frequency switch circuit disposed downstream of the bandpass filter circuit for switching the two-way connection of the bandpass filter circuit to a receiving circuit of the first communications system and a transmitting/receiving circuit of the third communications system; a path connected to the higher-frequency-side filter circuit of the first diplexer circuit being connected to a receiving circuit of the second communications system; a path connected to the lower-frequency-side filter circuit of the second diplexer circuit being connected to a transmitting circuit of the first communications system; and a path connected to the higher-frequency-side filter circuit of the second diplexer circuit being connected to a transmitting circuit of the second communications system. The term "downstream" used herein indicates a positional relation when viewed from the antenna, but does not indicate the flow of a transmitting signal or a received signal.

The first multiband high-frequency circuit preferably comprises a balanced-unbalanced conversion circuit between the second high-frequency switch circuit and the receiving circuit of the first communications system. Also, it preferably comprises a balanced-unbalanced conversion circuit between the second high-frequency switch circuit and the transmitting/receiving circuit of the third communications system.

The second multiband high-frequency circuit of the present invention, which is used between an antenna capable of conducting transmission and reception in at least three communications systems, and transmitting and receiving circuits of at least three communications systems, comprises a first high-frequency switch circuit for switching the connections of the antenna to first and second paths, a first diplexer circuit disposed in the first path, and a second diplexer circuit disposed in the second path; each of the first and second diplexer circuits comprising a lower-frequency-side filter circuit and a higher-frequency-side filter circuit; a path connected to the lower-frequency-side filter circuit of the first diplexer circuit being provided with a bandpass filter circuit, and a power-dividing circuit disposed downstream of the bandpass filter circuit; the power-dividing circuit for dividing a signal from the bandpass filter circuit to a receiving circuit of the first communications system and a transmitting/receiving circuit of the third communications system, and permitting a transmitting signal from the transmitting/receiving circuit of the third communications system to enter the bandpass filter circuit; a path connected to the higher-frequency-side filter circuit of the first diplexer circuit being connected to a receiving circuit of the second communications system; a path connected to the lower-frequency-side filter circuit of the second diplexer circuit being connected to a transmitting circuit of the first communications system; and a path connected to the higher-frequency-side filter circuit of the second diplexer circuit being connected to a transmitting circuit of the second communications system.

The second multiband high-frequency circuit preferably comprises a balanced-unbalanced conversion circuit between the power-dividing circuit and the receiving circuit of the first communications system. Also, it preferably comprises a balanced-unbalanced conversion circuit between the power-dividing circuit and the transmitting/receiving circuit of the third communications system.

The third multiband high-frequency circuit of the present invention, which is used between an antenna capable of conducting transmission and reception in at least three communications systems, and transmitting and receiving circuits of at least three communications systems, comprises a first high-frequency switch circuit for switching the connections of the antenna to first and second paths, a first diplexer circuit disposed in the first path, and a second diplexer circuit disposed in the second path; each of the first and second diplexer circuits comprising a lower-frequency-side filter circuit and a higher-frequency-side filter circuit; a path connected to the lower-frequency-side filter circuit of the first diplexer circuit being provided with a bandpass filter circuit, and a coupler circuit downstream of the bandpass filter circuit; the coupler circuit comprising a main line connected to the bandpass filter circuit and the receiving circuit of the first communications system, and a sub-line connected to the transmitting/receiving circuit of the third communications system; a path connected to the higher-frequency-side filter circuit of the first diplexer circuit being connected to a receiving circuit of the second communications system; a path connected to the lower-frequency-side filter circuit of the second diplexer circuit being connected to a transmitting circuit of the first communications system; and a path connected to the higher-frequency-side filter circuit of the second diplexer circuit being connected to a transmitting circuit of the second communications system.

The third multiband high-frequency circuit preferably comprises a balanced-unbalanced conversion circuit between the coupler circuit and the receiving circuit of the first communications system. Also, it preferably comprises a balanced-unbalanced conversion circuit between the coupler circuit and the transmitting/receiving circuit of the third communications system.

The fourth multiband high-frequency circuit of the present invention, which is used between an antenna capable of conducting transmission and reception in at least three communications systems, and transmitting and receiving circuits of at least three communications systems, comprises a high-frequency switch circuit for switching the three-way connection of the antenna to first to third paths, a first diplexer circuit disposed in the first path, and a second diplexer circuit disposed in the second path; each of the first and second diplexer circuits comprising a lower-frequency-side filter circuit and a higher-frequency-side filter circuit; a path connected to the lower-frequency-side filter circuit of the first diplexer circuit being provided with a bandpass filter circuit, and the third path being provided with a bandpass filter circuit; the bandpass filter circuit in a path connected to the lower-frequency-side filter circuit of the first diplexer circuit being connected to a receiving circuit of the first communications system; a path connected to the higher-frequency-side filter circuit of the first diplexer circuit being connected to a receiving circuit of the second communications system; a path connected to the lower-frequency-side filter circuit of the second diplexer circuit being connected to a transmitting circuit of the first communications system; a path connected to the higher-frequency-side filter circuit of the second diplexer circuit being connected to a transmitting circuit of the second communications system; and the bandpass filter circuit in the third path being connected to a transmitting/receiving circuit of the third communications system.

The fourth multiband high-frequency circuit preferably comprises a balanced-unbalanced conversion circuit between the bandpass filter circuit disposed downstream of the lower-frequency-side filter circuit of the first diplexer circuit and the receiving circuit of the first communications system. Also, it preferably comprises a balanced-unbalanced conversion circuit between the bandpass filter circuit in the third path and the transmitting/receiving circuit of the third communications system.

The fifth multiband high-frequency circuit of the present invention, which is used between an antenna capable of conducting transmission and reception in at least three communications systems, and transmitting and receiving circuits of at least three communications systems, comprises a first high-frequency switch circuit for switching the two-way connection of the antenna to first and second paths, a first diplexer circuit disposed in the first path, and a second diplexer circuit disposed in the second path; each of the first and second diplexer circuits comprising a lower-frequency-side filter circuit and a higher-frequency-side filter circuit; a coupler circuit being disposed between the antenna and the high-frequency switch circuit; the coupler circuit comprising a main line connected to the antenna and the high-frequency switch circuit, and a sub-line connected to the transmitting/receiving circuit of the third communications system; a path connected to the lower-frequency-side filter circuit of the first diplexer circuit being provided with a bandpass filter circuit connected to the receiving circuit of the first communications system; a path connected to the higher-frequency-side filter circuit of the first diplexer circuit being connected to a receiving circuit of the second communications system; a path connected to the lower-frequency-side filter circuit of the second diplexer circuit being connected to a transmitting circuit of the first communications system; and a path connected to the higher-frequency-side filter circuit of the second diplexer circuit being connected to a transmitting circuit of the second communications system.

The fifth multiband high-frequency circuit preferably comprises a balanced-unbalanced conversion circuit between the bandpass filter circuit and the receiving circuit of the first communications system. Also, it preferably comprises a balanced-unbalanced conversion circuit between the coupler circuit and the transmitting/receiving circuit of the third communications system.

Each of the above multiband high-frequency circuits preferably comprises a first high-frequency power amplifier between the lower-frequency-side filter circuit of the second diplexer circuit and the transmitting circuit of the first communications system, and a second high-frequency power amplifier between the higher-frequency-side filter circuit of the second diplexer circuit and the transmitting circuit of the second system. Also, it preferably comprises a low-noise amplifier between the first diplexer circuit and the receiving circuit of the second communications system. Further, it preferably comprises a detection circuit between the multiband antenna and the second diplexer circuit.

Each of the above multiband high-frequency circuits preferably comprises a lowpass filter circuit between the multiband antenna and the second high-frequency amplifier. Also, it preferably comprises a bandpass filter circuit between the first high-frequency power amplifier and the transmitting circuit of the first communications system. Further, it preferably comprises a bandpass filter circuit between the second high-frequency power amplifier and the transmitting circuit of the second communications system. Further, it preferably comprises a balanced-unbalanced conversion circuit between the first diplexer circuit and the receiving circuit of the second communications system.

The multiband high-frequency circuit device of the present invention having the above multiband high-frequency circuit comprises a laminate substrate in which pluralities of circuit elements including at least one of line electrodes, capacitor electrodes, ground electrodes and via-holes are formed, circuit elements mounted on the laminate substrate, an antenna terminal, transmitting and receiving terminals of the first communications system, transmitting and receiving terminals of the second communications system, and a transmitting/receiving terminal of the third communications system.

In the above multiband high-frequency circuit device, the diplexer circuit and the bandpass filter circuit are preferably constituted by inductance elements and capacitance elements formed in the laminate substrate. Also, the balanced-unbalanced conversion circuit is preferably constituted by inductance elements and capacitance elements formed in the laminate substrate. Further, a semiconductor element constituting at least one of the high-frequency switch, the high-frequency power amplifier and the low-noise amplifier is preferably mounted on the laminate substrate.

In the above multiband high-frequency circuit device, a lowpass filter circuit is preferably constituted by inductance elements and capacitance elements formed in the laminate substrate. The laminate substrate is preferably obtained by laminating ceramic green sheets each provided with proper electrode patterns and sintering them.

The multiband communications apparatus of the present invention comprises the above multiband high-frequency circuit device. Such multiband communications apparatuses include, for instance, personal computers (PCs), PC peripherals such as printers, hard disk drives, broadband rooters, etc., electronic appliances such as facsimiles, refrigerators, standard television sets (SDTVs), high-definition television sets (HDTVs), digital cameras, videorecorders, cell phones, etc., and signal-transmitting means used in automobiles or aircrafts as alternatives of wired communications.

DESCRIPTION OF THE PREFERRED EMBODIMENTS

Figure 1:
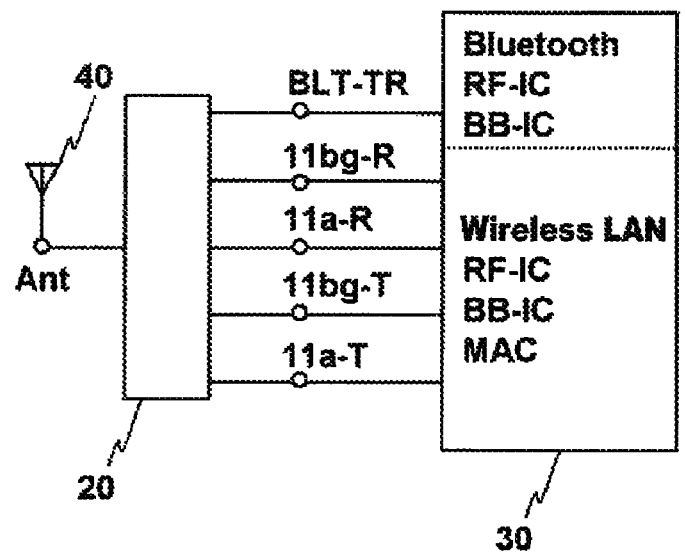
FIG. 1 is a block diagram showing a multiband communications apparatus according to one embodiment of the present invention.

In figures showing multiband high-frequency circuits according to the embodiments of the present invention and their circuit devices, and multiband communications apparatuses, the same reference numerals are assigned to parts having similar functions. Explanations made on the structures and functions of parts bearing the same reference numerals in one embodiment are applicable to other embodiments unless otherwise mentioned. Accordingly, the explanation made in one embodiment will not be repeated in other embodiments.

FIG. 1 shows a communications apparatus according to one embodiment of the present invention, which is usable for at least three communications systems, for instance, 2.4-GHz-band wireless LAN (IEEE802.11b and/or IEEE802.11g), 2.4-GHz-band Bluetooth, and 5-GHz-band wireless LAN (IEEE802.11a and/or IEEE802.11h). Taking for example a case where the first communications system is 2.4-GHz-band wireless LAN, the second communications system is 5-GHz-band wireless LAN, and the third communications system is Bluetooth, explanation will be made below.

A multiband high-frequency circuit 20 in this communications apparatus is disposed between a multiband antenna 40 and a high-frequency circuit 30 in which a radio-frequency integrated circuit (RF-IC) for 2.4-GHz-band wireless LAN, 5-GHz-band wireless LAN and Bluetooth, a base-band integrated circuit (BB-IC), a media access control (MAC) are integrated, an antenna port (Ant) connected to the multiband antenna 40 being connected to five paths to a transmitting circuit (11*bg*-T) and a receiving circuit (11*bg*-R) of 2.4-GHz-band wireless LAN, a transmitting and receiving circuit (BLT-TR) of Bluetooth, a transmitting circuit (11*a*-T) and a receiving circuit (11*a*-R) of 5-GHz-band wireless LAN, via branching means or diplexers. The multiband high-frequency circuit 20 of the present invention may be formed into a module with the high-frequency circuit 30.

[1] Multiband High-Frequency Circuit

Figure 2:
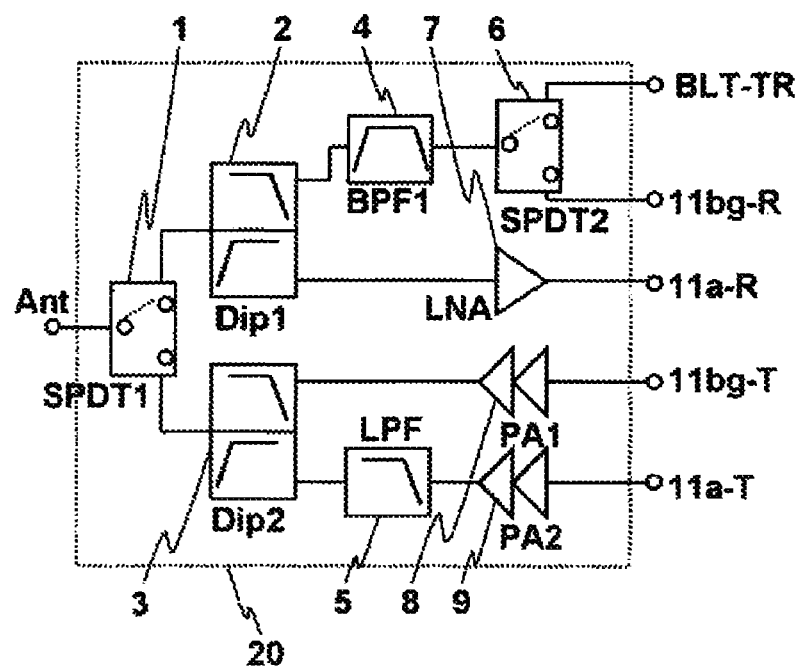
FIG. 2 is a block diagram showing a multiband high-frequency circuit according to one embodiment of the present invention.

FIG. 2 shows the structure of the multiband high-frequency circuit 20 according to one embodiment of the present invention. This multiband high-frequency circuit 20 comprises a first high-frequency switch circuit (SPDT1) 1 connected to an antenna port Ant, whose downstream side is connected to a first diplexer circuit (Dip1) 2 and a second diplexer circuit (Dip2) 3. The first diplexer circuit (Dip1) 2 is constituted by a lower-frequency-side filter circuit passing a received signal of 2.4-GHz-band wireless LAN or transmitting and received signals of Bluetooth and attenuating a received signal of 5-GHz-band wireless LAN, and a higher-frequency-side filter circuit passing the received signal of 5-GHz-band wireless LAN and attenuating the received signal of 2.4-GHz-band wireless LAN or the transmitting and received signals of Bluetooth. The second diplexer circuit (Dip2) 3 is constituted by a lower-frequency-side filter circuit passing a transmitting signal of 2.4-GHz-band wireless LAN and attenuating a transmitting signal of 5-GHz-band wireless LAN, and a higher-frequency-side filter circuit passing the transmitting signal of 5-GHz-band wireless LAN and attenuating the transmitting signal of 2.4-GHz-band wireless LAN.

Connected to a downstream side of the lower-frequency-side filter circuit of the first diplexer circuit (Dip1) 2 are a bandpass filter circuit (BPF1) 4 and a second high-frequency switch circuit (SPDT2) 6 in this order. The bandpass filter circuit (BPF1) 4 selectively passes signals in a receiving frequency of 2.4-GHz-band wireless LAN or a transmitting/receiving frequency of Bluetooth, and attenuates signals in other frequencies, thereby exhibiting a function of enhancing sensitivity when receiving 2.4-GHz-band wireless LAN or Bluetooth and suppressing the generation of harmonics at the time of transmitting Bluetooth. The second high-frequency switch circuit (SPDT2) 6 switches the connection of the bandpass filter circuit (BPF1) 4 to a receiving circuit 11*bg*-R of 2.4-GHz-band wireless LAN (first communications system), and to a transmitting/receiving circuit BLT-TR of Bluetooth (third communications system).

The higher-frequency-side filter circuit of the first diplexer circuit (Dip1) 2 is connected to a low-noise amplifier (LNA) 7, which is then connected to a receiving circuit 11*a*-R of 5-GHz-band wireless LAN (second communications system). The low-noise amplifier (LNA) 7 amplifies a received signal of 5-GHz-band wireless LAN, thereby enhancing receiving sensitivity. Connected to a downstream side of the lower-frequency-side filter circuit of the second diplexer circuit (Dip2) 3 are a first high-frequency power amplifier (PA1) 8 and a transmitting circuit 11*bg*-T of 2.4-GHz-band wireless LAN (first communications system) in this order. The first high-frequency power amplifier (PA1) 8 amplifies a transmitting signal coming from the first communications system (transmitting circuit 11*bg*-T of 2.4-GHz-band wireless LAN). Connected to a downstream side of the higher-frequency-side filter circuit of the second diplexer circuit (Dip2) 3 are a second high-frequency power amplifier (PA2) 9 and a transmitting circuit 11*a*-T of 5-GHz-band wireless LAN (second communications system) in this order. The second high-frequency power amplifier (PA2) 9 amplifies a transmitting signal coming from the second system (transmitting circuit 11*a*-T of 5-GHz-band wireless LAN).

A lowpass filter circuit (LPF) 5 is disposed between the higher-frequency-side filter circuit of the second diplexer circuit (Dip2) 3 and the second high-frequency power amplifier (PA2) 9. The lowpass filter (LPF) 5 passes a transmitting signal amplified by the second high-frequency power amplifier (PA2) 9, and attenuates harmonic signals generated by the second high-frequency power amplifier (PA2) 9. Harmonic signals generated by the first high-frequency power amplifier (PA1) 8 should be attenuated, and this can be achieved by the lower-frequency-side filter of the second diplexer circuit (Dip2) 3 to some extent. However, when the lower-frequency-side filter circuit of the second diplexer circuit (Dip2) 3 does not have sufficient attenuation characteristics, another lowpass filter may be disposed between the first high-frequency power amplifier (PA1) 8 and the lower-frequency-side filter circuit of the second diplexer circuit (Dip2) 3.

In this embodiment, at least one of the low-noise amplifier (LNA) 7, the first high-frequency power amplifier (PA1) 8, the second high-frequency power amplifier (PA2) 9, and the lowpass filter circuit (LPF) 5 may be omitted. The same is true of a later-described multiband high-frequency circuit device. In that case, the structure of the multiband high-frequency circuit device may be properly changed in view of relations with upstream and downstream circuits, so that the above circuits may be included or omitted.

Because the bandpass filter circuit (BPF1) 4 is used in both of the receiving path of 2.4-GHz-band wireless LAN and the transmitting/receiving path of Bluetooth in the circuit structure shown in FIG. 2, the number of bandpass filters conventionally needed for the receiving path of 2.4-GHz-band wireless LAN and the transmitting/receiving path of Bluetooth separately can be reduced to 1. Also, the transmitting signal of 2.4-GHz-band wireless LAN and the transmitting signal of 5-GHz-band wireless LAN, which have high power, are not directly transmitted to the second high-frequency switch circuit 6, but only the received signal of 2.4-GHz-band wireless LAN and the transmitting and received signals of Bluetooth, which have low power, are transmitted to the second high-frequency switch circuit 6. Accordingly, small switch elements can be used. These are particularly effective, when the circuit structure is constituted by a laminate comprising electrode patterns and elements mounted thereon.

Figure 3:
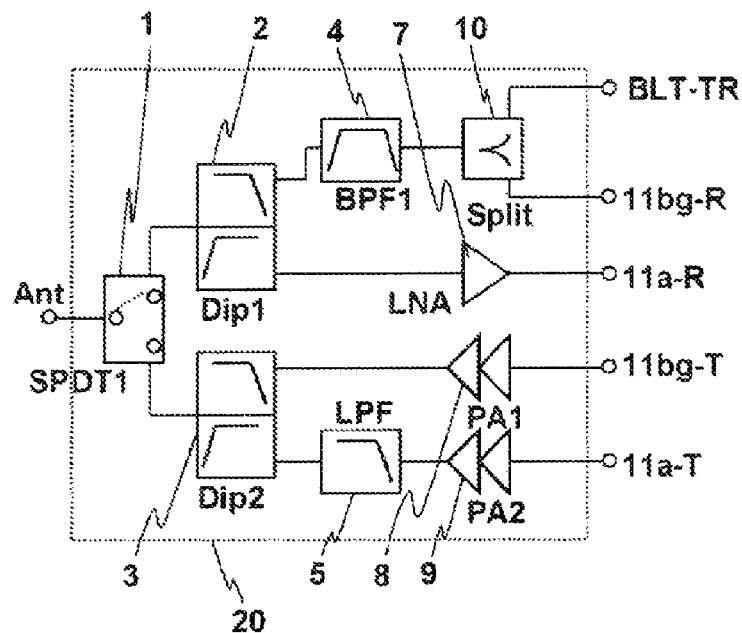
FIG. 3 is a block diagram showing a multiband high-frequency circuit according to another embodiment of the present invention.

FIG. 3 shows a multiband high-frequency circuit according to another embodiment of the present invention commonly usable in at least three communications systems (for instance, 2.4-GHz-band wireless LAN, Bluetooth, and 5-GHz-band wireless LAN). Because this high-frequency circuit has a similar structure to that of the high-frequency circuit shown in FIG. 2, only differences will be explained. The high-frequency circuit shown in FIG. 3 comprises a power-dividing circuit (Split) 10 in place of the second high-frequency switch circuit 6 shown in FIG. 2. The power-dividing circuit 10 divides a signal power from the first bandpass filter 4 to the receiving circuit 11*bg*-R of 2.4-GHz-band wireless LAN and the transmitting/receiving circuit BLT-TR of Bluetooth substantially equally. Accordingly, the receiving circuit 11*bg*-R in the first communications system and the transmitting/receiving circuit BLT-TR in the third communications system can be simultaneously connected to the antenna port Ant. Accordingly, a signal received by the multiband antenna 40 can be simultaneously transmitted to the receiving circuit 11*bg*-R of 2.4-GHz-band wireless LAN and the transmitting/receiving circuit BLT-TR of Bluetooth, so that signals of 2.4-GHz-band wireless LAN and Bluetooth can be simultaneously received. A transmitting signal from the transmitting/receiving circuit BLT-TR of Bluetooth can be transmitted to the multiband antenna 40.

Figure 4:
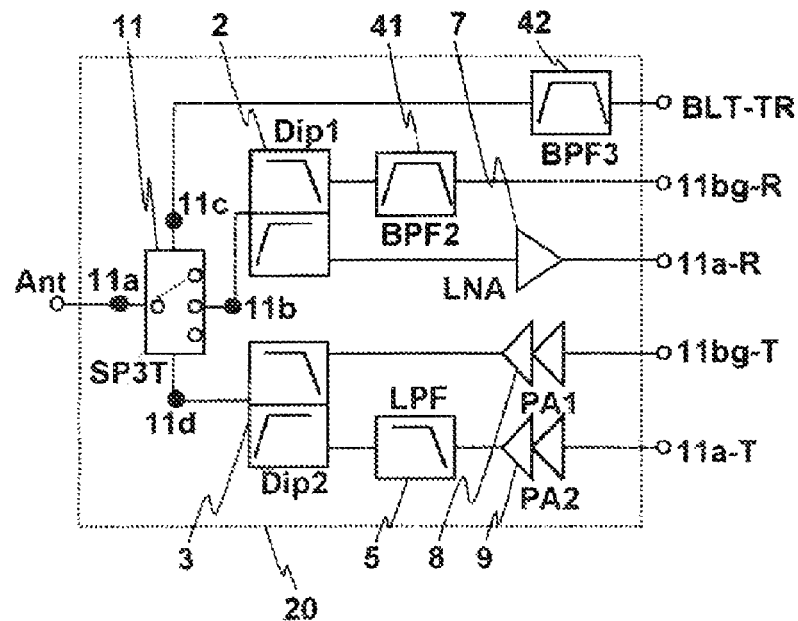
FIG. 4 is a block diagram showing a multiband high-frequency circuit according to a further embodiment of the present invention.

FIG. 4 shows a multiband high-frequency circuit according to a further embodiment of the present invention. Because this high-frequency circuit is similar to that shown in FIG. 2, only differences will be explained. The high-frequency circuit shown in FIG. 4 comprises a high-frequency switch circuit (SP3T) 11 of a single-pole, triple-throw type in place of the first high-frequency switch circuit 1 shown in FIG. 2. The high-frequency switch circuit (SP3T) 11 is connected to the antenna port Ant, and switches three paths to a first diplexer circuit 2, a second diplexer circuit 3 and a bandpass filter circuit (BPF3) 42. The lower-frequency-side filter circuit of the first diplexer circuit 2 is connected to the bandpass filter circuit 41, which selectively passes signals in a receiving frequency of 2.4-GHz-band wireless LAN, and attenuates signals in the other frequency (5-GHz band), thereby enhancing sensitivity when receiving 2.4-GHz-band wireless LAN. The higher-frequency-side filter circuit of the first diplexer circuit 2 passes a received signal of 5-GHz-band wireless LAN and attenuates a received signal of 2.4-GHz-band wireless LAN. The third bandpass filter 42 selectively passes signals in a transmitting/receiving frequency of Bluetooth and attenuates signals in other frequencies, thereby enhancing sensitivity when receiving Bluetooth and suppressing harmonics when transmitting Bluetooth. This can reduce the number of circuits disposed between the antenna port Ant and the transmitting/receiving circuit BLT-TR in the third communications system, thereby decreasing loss between the multiband antenna 40 and the transmitting/receiving circuit BLT-TR in the third communications system.

Figure 5:
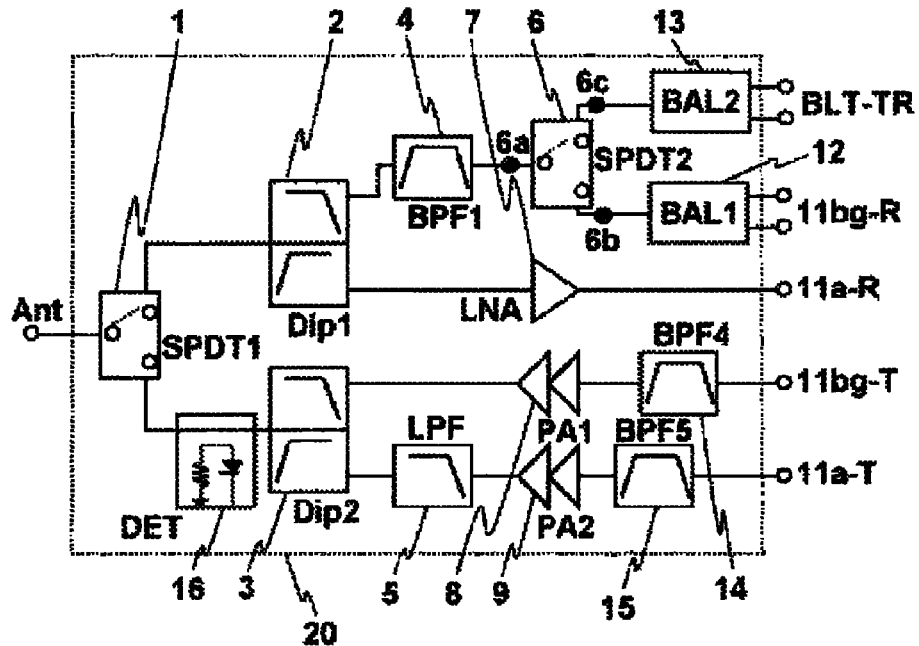
FIG. 5 is a block diagram showing a multiband high-frequency circuit according to a still further embodiment of the present invention.

FIG. 5 shows a multiband high-frequency circuit according to a still further embodiment of the present invention. This high-frequency circuit comprises two balanced-unbalanced conversion circuits (BAL1, BAL2) 12, 13, two bandpass filter circuits (BPF4, BPF5) 14, 15, and a detection circuit 16, which are added to the high-frequency circuit shown in FIG. 2. Because these parts have their own characteristics, they can be added or removed separately.

The first balanced-unbalanced conversion circuit 12 is a circuit for converting a signal of 2.4-GHz-band wireless LAN received by the multiband antenna from an unbalanced signal to a balanced signal. The first balanced-unbalanced conversion circuit 12 may have different input impedance and output impedance. The first balanced-unbalanced conversion circuit 12 is disposed between the second port 6*b* of the second high-frequency switch circuit 6 and the receiving circuit 11*bg*-R of 2.4-GHz-band wireless LAN to constitute a balanced circuit, so that the receiving circuit 11*bg*-R of 2.4-GHz-band wireless LAN can be provided with improved noise resistance without increasing loss in a path for transmitting signals of 2.4-GHz-band wireless LAN and 5-GHz-band wireless LAN, a path for a received signal of 5-GHz-band wireless LAN, and a path for transmitting and received signals of Bluetooth.

In Bluetooth with small transmitting signal power, both of a receiving circuit and a transmitting circuit may be a balanced circuit. The second balanced-unbalanced conversion circuit 13 converts not only the received signal of Bluetooth received by the multiband antenna from an unbalanced signal to a balanced signal, but also the transmitting signal of Bluetooth input as a balanced signal to an unbalanced signal. The second balanced-unbalanced conversion circuit 13 may have different input impedance and output impedance. The second balanced-unbalanced conversion circuit 13 is disposed between the third port 6*c* of the second high-frequency switch circuit 6 and the transmitting/receiving circuit BLT-TR of Bluetooth to constitute a balanced circuit, so that the transmitting/receiving circuit BLT-TR of Bluetooth can be provided with improved noise resistance without increasing loss in a path for transmitting signals of 2.4-GHz-band wireless LAN and 5-GHz-band wireless LAN, and a path for received signals of 2.4-GHz-band wireless LAN and 5-GHz-band wireless LAN.

The bandpass filter circuit 14 selectively passes signals in the transmitting frequency of 2.4-GHz-band wireless LAN, and attenuates signals in other frequencies. With the bandpass filter circuit 14 disposed between the first high-frequency power amplifier 8 and the transmitting circuit 11*bg*-T of 2.4-GHz-band wireless LAN, noise signals (for instance, local signals used in RFIC, etc.) coming from the transmitting circuit 11*bg*-T of 2.4-GHz-band wireless LAN can be attenuated until they reach the first high-frequency power amplifier 8, thereby preventing the first high-frequency power amplifier 8 from amplifying other signals than transmitting signals.

The bandpass filter circuit 15 selectively passes signals in the transmitting frequency of 5-GHz-band wireless LAN, and attenuates signals in other frequencies. With the fifth bandpass filter 15 disposed between the second high-frequency power amplifier 9 and the transmitting circuit 11*a*-T of 5-GHz-band wireless LAN, noise signals (for instance, local signals used in RFIC, etc.) coming from the transmitting circuit 11*a*-T of 5-GHz-band wireless LAN can be attenuated until they reach the second high-frequency power amplifier 9, thereby preventing the second high-frequency power amplifier 9 from amplifying other signals than transmitting signals.

The detection circuit (DET) 16 monitors the transmitting power of 2.4-GHz-band wireless LAN and the transmitting power of 5-GHz-band wireless LAN. With the detection circuit 16 disposed between the antenna port Ant and the second diplexer circuit 3, the transmitting power of 2.4-GHz-band wireless LAN and the transmitting power of 5-GHz-band wireless LAN can be monitored by one detection circuit, thereby reducing the number of parts.

Figure 6:
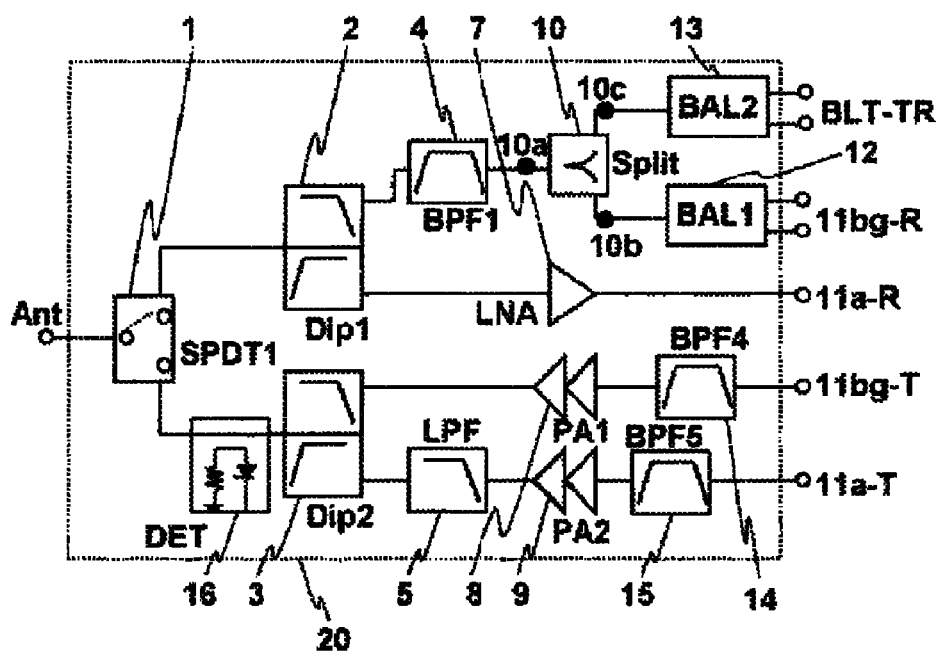
FIG. 6 is a block diagram showing a multiband high-frequency circuit according to a still further embodiment of the present invention.

FIG. 6 shows a multiband high-frequency circuit according to a still further embodiment of the present invention. This multiband high-frequency circuit comprises two balanced-unbalanced conversion circuits (BAL1, BAL2) 12, 13, two bandpass filter circuits (BPF4, BPF5) 14, 15, and a detection circuit (DET) 16 attached to the multiband high-frequency circuit shown in FIG. 3. Because these additional circuits are the same as shown in FIG. 5, their explanation will be omitted.

Figure 7:
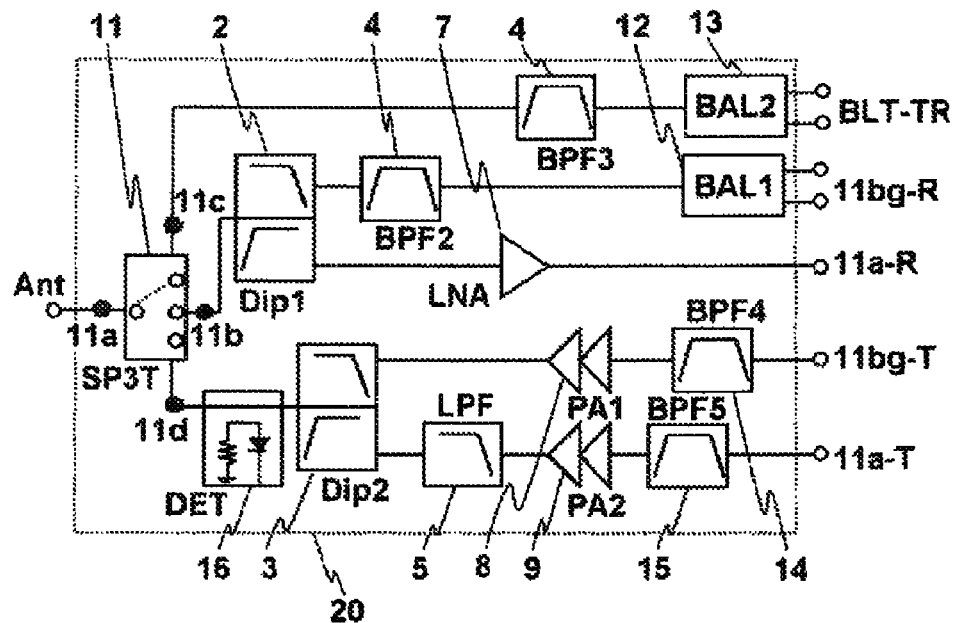
FIG. 7 is a block diagram showing a multiband high-frequency circuit according to a still further embodiment of the present invention.

FIG. 7 shows a multiband high-frequency circuit according to a still further embodiment of the present invention. This multiband high-frequency circuit comprises two balanced-unbalanced conversion circuits (BAL1, BAL2) 12, 13, two bandpass filter circuits (BPF4, BPF5) 14, 15, and a detection circuit (DET) 16, which are added to the multiband high-frequency circuit shown in FIG. 4. Because these additional circuits are the same as shown in FIG. 5, their explanation will be omitted.

Figure 8:
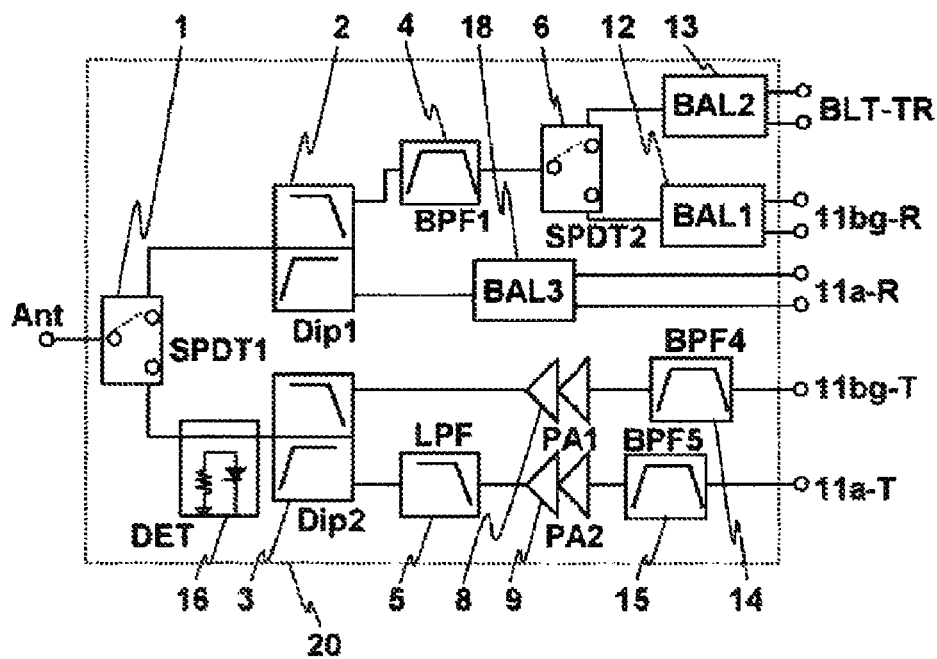
FIG. 8 is a block diagram showing a multiband high-frequency circuit according to a still further embodiment of the present invention.

FIG. 8 shows a multiband high-frequency circuit according to a still further embodiment of the present invention. This multiband high-frequency circuit is the same as shown in FIG. 5, except for comprising a third balanced-unbalanced conversion circuit (BAL3) 18 in place of the low-noise amplifier (LNA) 7. The third balanced-unbalanced conversion circuit 18 converts a received signal of 5-GHz-band wireless LAN received by the multiband antenna from an unbalanced signal to a balanced signal. The third balanced-unbalanced conversion circuit 18 may have different input impedance and output impedance. The third balanced-unbalanced conversion circuit 18 is disposed between the higher-frequency-side filter circuit of the first diplexer circuit 2 and the receiving circuit 11a-R of 5-GHz-band wireless LAN to constitute a balanced circuit, so that the receiving circuit 11a-R of 5-GHz-band wireless LAN can be provided with improved noise resistance without increasing loss in a path for transmitting signals of 2.4-GHz-band wireless LAN and 5-GHz-band wireless LAN, and a path for transmitting and received signals of 2.4-GHz-band wireless LAN and Bluetooth.

Figure 9:
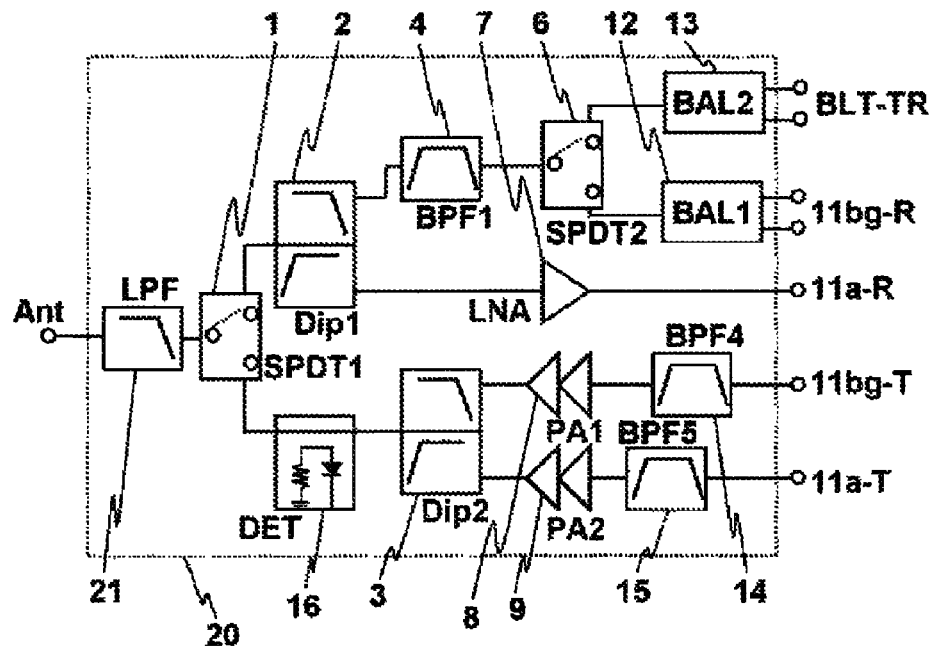
FIG. 9 is a block diagram showing a multiband high-frequency circuit according to a still further embodiment of the present invention.

FIG. 9 shows a multiband high-frequency circuit according to a still further embodiment of the present invention. This multiband high-frequency circuit comprises a lowpass filter circuit (LPF) 21, which is disposed between the antenna port Ant and the first high-frequency switch circuit 1 in the multiband high-frequency circuit shown in FIG. 5. The lowpass filter circuit 21 passes a transmitting or received signal of 2.4-GHz-band wireless LAN, Bluetooth, or 5-GHz-band wireless LAN, and attenuates frequencies higher than 3 times the transmitting frequencies of 2.4-GHz-band wireless LAN and Bluetooth, or frequencies higher than 2 times the transmitting frequency of 5-GHz-band wireless LAN, and harmonics of 2.4-GHz-band or 5-GHz-band wireless LAN generated from the detection circuit 16 and the high-frequency switch circuit 1 during transmitting.

Figure 10:
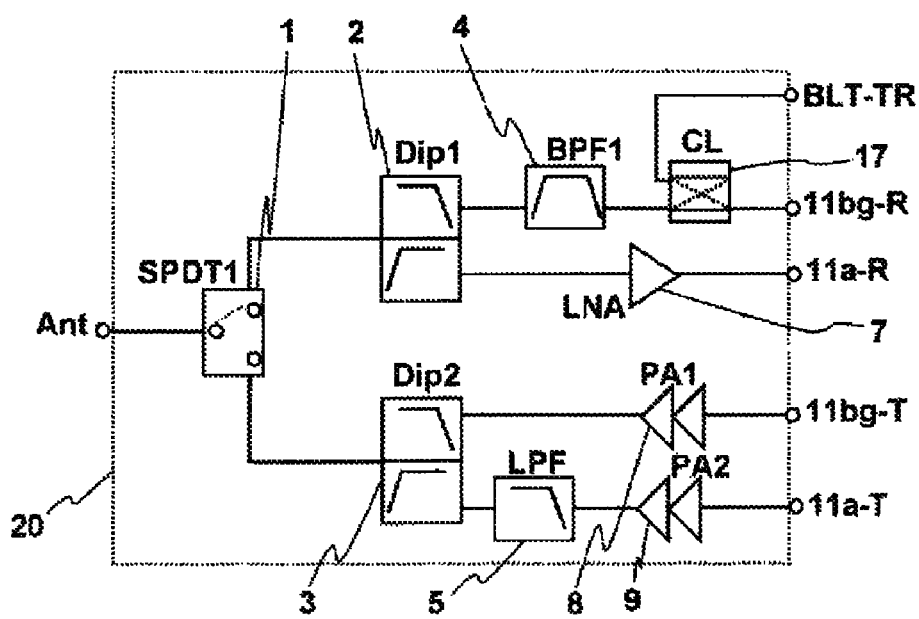
FIG. 10 is a block diagram showing a multiband high-frequency circuit according to a still further embodiment of the present invention.

FIG. 10 shows a multiband high-frequency circuit according to a still further embodiment of the present invention. This multiband high-frequency circuit is usable in at least three communications systems (for instance, 2.4-GHz-band wireless LAN, Bluetooth and 5-GHz-band wireless LAN). This multiband high-frequency circuit is the same as shown in FIG. 2, except for comprising a coupler circuit (CL) 17 in place of the second high-frequency switch circuit 6. The coupler circuit (CL) 17 can simultaneously connect the receiving circuit 11bg-R in the first communications system and the transmitting/receiving circuit BLT-TR in the third communications system to the antenna port Ant. Accordingly, signals received by the antenna port Ant can be transmitted simultaneously to the receiving circuit 11bg-R of 2.4-GHz-band wireless LAN and the transmitting/receiving circuit BLT-TR of Bluetooth, thereby making 2.4-GHz-band wireless LAN and Bluetooth simultaneously receivable. Because the coupler circuit 17 can set a dividing ratio to the receiving circuit 11bg-R of wireless LAN and the transmitting/receiving circuit BLT-TR of Bluetooth at a proper level, for instance, at 5:1 or 10:1, the ratio of Bluetooth signals to wireless LAN signals can be optimized. For instance, in a short distance, the minimum receiving sensitivity of Bluetooth is −70 dBm, lower than −65 dBm of the wireless LAN. Accordingly, when the wireless LAN signals and the Bluetooth signals are simultaneously received, efficient signal receiving can be achieved by a smaller signal distribution to Bluetooth needing smaller power than that of the coupler circuit 17, and a larger signal distribution to the wireless LAN receiving circuit needing larger power. The coupler circuit 17 can send a transmitting signal from the transmitting/receiving circuit BLT-TR of Bluetooth to the multiband antenna.

Figure 11:
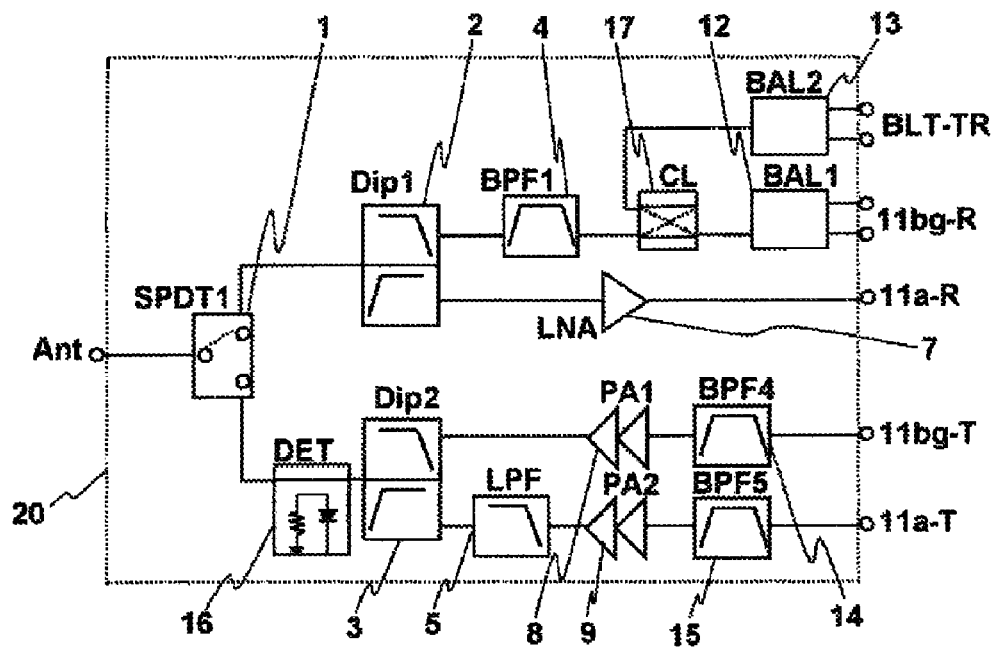
FIG. 11 is a block diagram showing a multiband high-frequency circuit according to a still further embodiment of the present invention.

FIG. 11 shows a multiband high-frequency circuit according to a still further embodiment of the present invention. This multiband high-frequency circuit comprises two balanced-unbalanced conversion circuits (BAL1, BAL2) 12, 13, two bandpass filter circuits (BPF4, BPF5) 14, 15, and a detection circuit (DET) 16, which are added to the multiband high-frequency circuit shown in FIG. 10. Because these additional circuits are the same as shown in FIG. 5, their explanation will be omitted.

Figure 12:
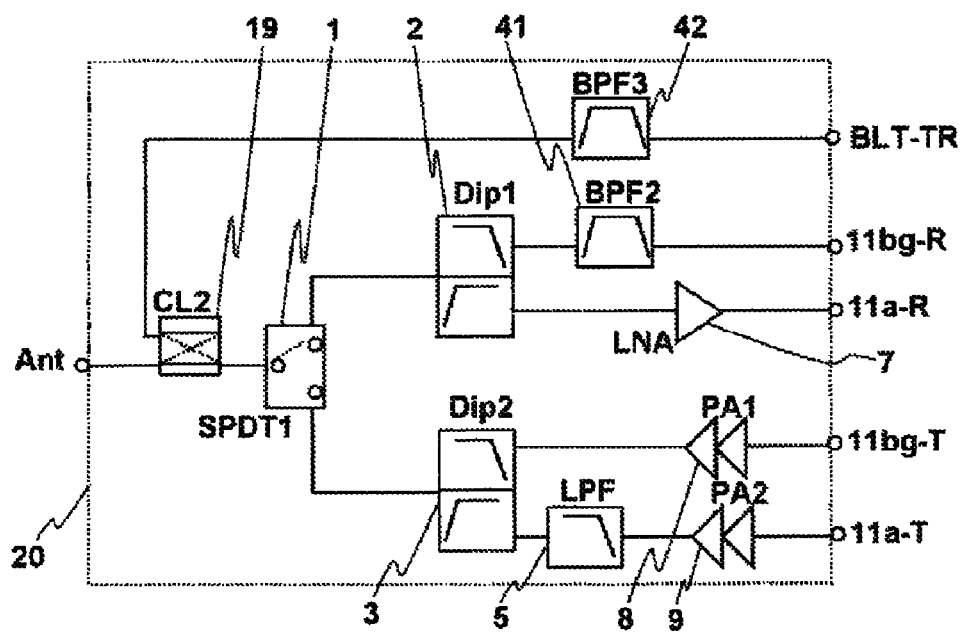
FIG. 12 is a block diagram showing a multiband high-frequency circuit according to a still further embodiment of the present invention.

FIG. 12 shows a multiband high-frequency circuit according to a still further embodiment of the present invention. This multiband high-frequency circuit is also usable in at least three communications systems (for instance, 2.4-GHz-band wireless LAN, Bluetooth and 5-GHz-band wireless LAN). This multiband high-frequency circuit is the same as shown in FIG. 4, except that the third high-frequency switch circuit (SP3T) 11 is changed to first high-frequency switch circuit 1 of a single-pole, dual-throw (SPDT) type, that a coupler circuit (CL2) 19 is disposed between the wireless antenna port Ant and the first high-frequency switch circuit (SPDT1) 1, and that a bandpass filter circuit (BPF3) 42 is disposed in a path from the coupler circuit 19 to the transmitting/receiving circuit BLT-TR in the third communications system. The bandpass filter circuit (BPF3) 42 may be omitted.

The arrangement of the coupler circuit (CL2) 19 as a branching circuit to the transmitting/receiving circuit BLT-TR of the third communications system (Bluetooth) between the first high-frequency switch circuit 1 and the antenna makes it unnecessary to dispose a switch circuit between the antenna and the transmitting/receiving circuit BLT-TR. As described above, changing the dividing ratio of the wireless LAN circuit to the Bluetooth circuit, the ratio of Bluetooth signals to wireless LAN signals can be properly set. Also, because the minimum receiving sensitivity of Bluetooth is −70 dBm, much lower than −65 dBm of wireless LAN, efficient transmitting and receiving of signals can be achieved by the coupler circuit 19 having a smaller signal distribution to the Bluetooth circuit needing smaller power, and a larger signal distribution to the wireless LAN circuit needing larger power. Incidentally, a distribution circuit may be disposed in place of the coupler circuit 19.

Figure 13:
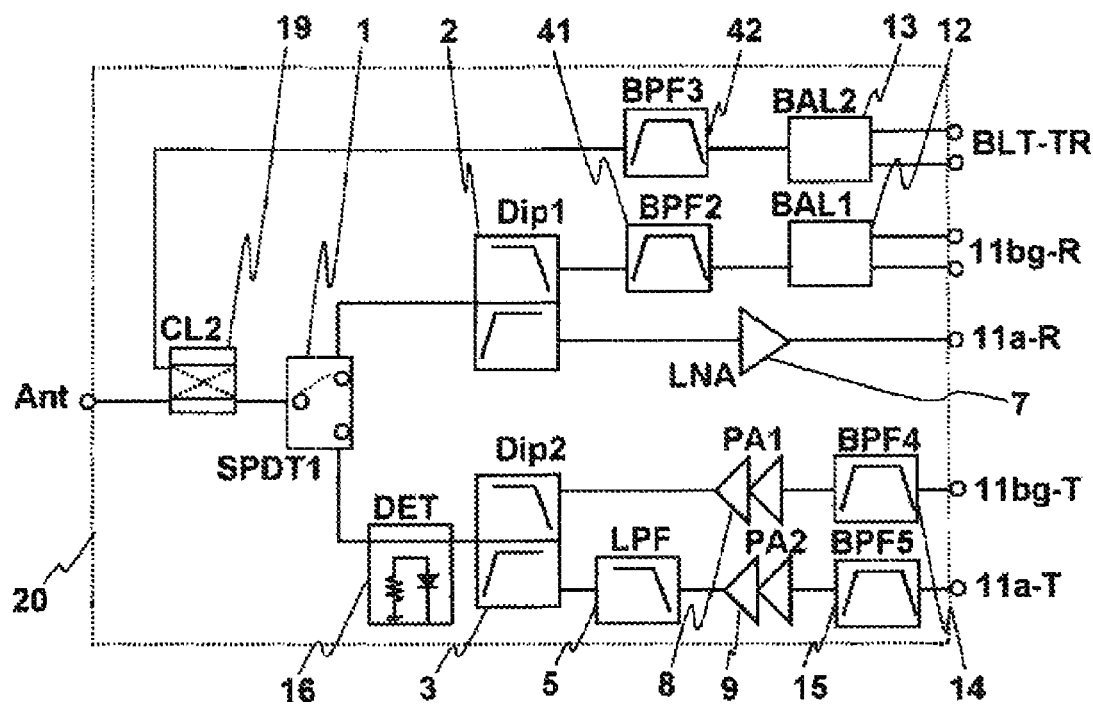
FIG. 13 is a block diagram showing a multiband high-frequency circuit according to a still further embodiment of the present invention.

FIG. 13 shows a multiband high-frequency circuit according to a still further embodiment of the present invention. This multiband high-frequency circuit comprises two balanced-unbalanced conversion circuits (BAL1, BAL2) 12, 13, two bandpass filter circuits (BPF4, BPF5) 14, 15, and a detection circuit (DET) 16, which are added to the multiband high-frequency circuit shown in FIG. 12. Because these additional circuits are the same as shown in FIG. 5, their explanation will be omitted.

Figure 14:
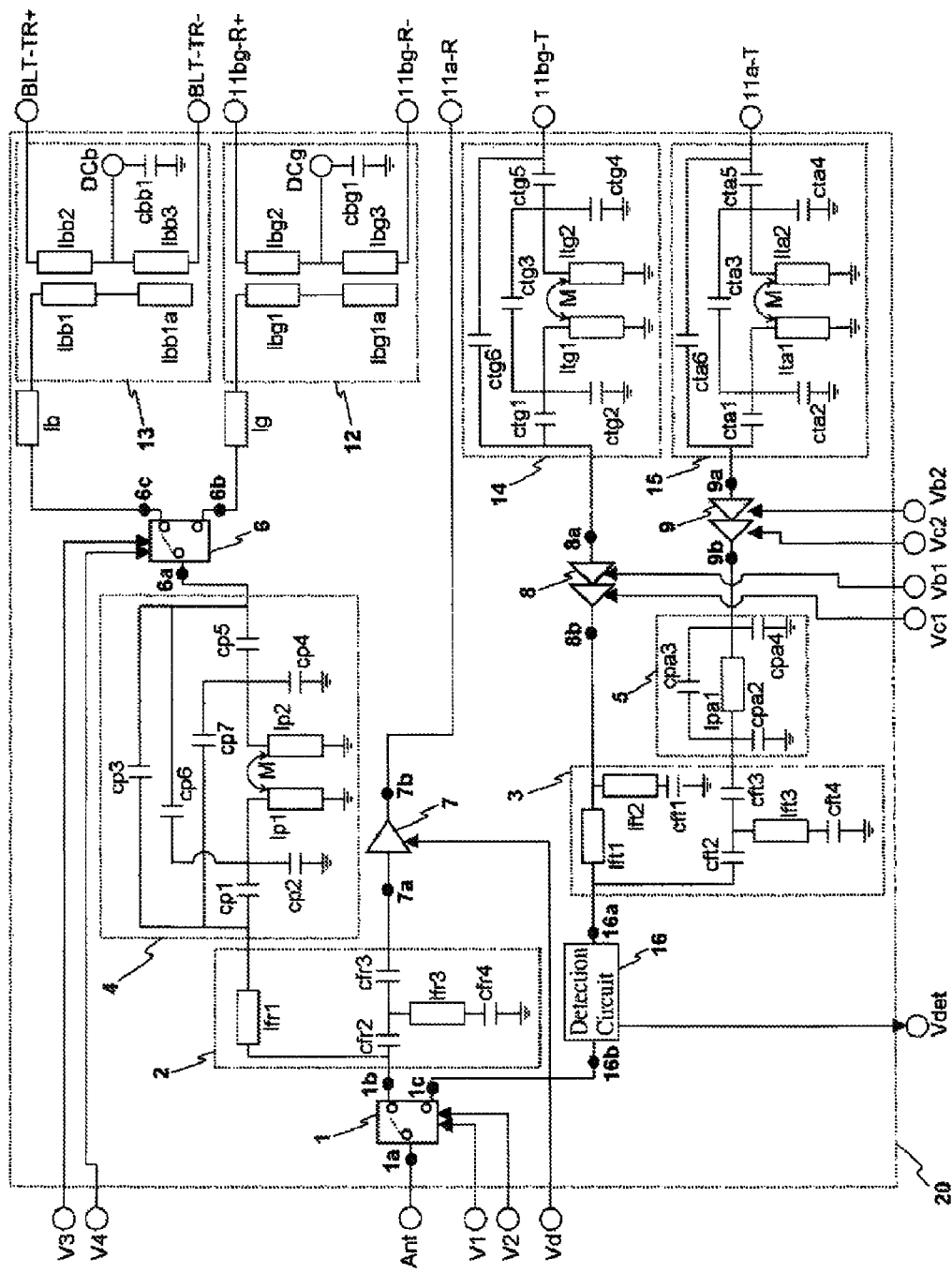
FIG. 14 is a view showing the equivalent circuit of the multiband high-frequency circuit shown in FIG. 5.

FIG. 14 shows an equivalent circuit of the high-frequency circuit shown in FIG. 5. The first and second diplexer circuits 2, 3 may be constituted by a proper combination of a lowpass filter circuit, a highpass filter circuit and a bandpass filter circuit, which comprise inductance elements and capacitance elements. In the example shown in FIG. 14, a lowpass filter circuit is used as the lower-frequency-side filter circuit, and a highpass filter circuit is used as the higher-frequency-side filter circuit.

The bandpass filter circuit 4 disposed downstream of the lower-frequency-side filter circuit of the diplexer circuit 2 is constituted by magnetically coupled inductance elements lp1 and lp2, and capacitance elements cp1, cp2, cp3, cp4, cp5, cp6, cp7. A parallel circuit of the inductance element lp1 and the capacitance element cp2, and a parallel circuit of the inductance element lp2 and the capacitance element cp4 have resonance frequencies within the system frequencies of 2.4-GHz-band wireless LAN and Bluetooth, respectively.

A bandpass filter circuit 14 downstream of a first high-frequency power amplifier (PA1) 8 is constituted by magnetically coupled inductance elements ltg1 and ltg2, and capacitance elements ctg1, ctg2, ctg3, ctg4, ctg5, ctg6. A parallel circuit of the inductance element ltg1 and the capacitance element ctg2 and a parallel circuit of the inductance element ltg2 and the capacitance element ctg4 preferably have resonance frequencies within the transmitting frequency of 2.4-GHz-band wireless LAN.

A bandpass filter circuit 15 downstream of a second high-frequency power amplifier (PA2) 9 is constituted by magnetically coupled inductance elements lta1 and lta2, and capacitance elements cta1, cta2, cta3, cta4, cta5, cta6. A parallel circuit of the inductance element lta1 and the capacitance element cta2 and a parallel circuit of the inductance element lta2 and the capacitance element cta4 preferably have resonance frequencies within the transmitting frequency of 5-GHz-band wireless LAN.

A lowpass filter circuit 5 downstream of a higher-frequency-side filter circuit of a second diplexer circuit 3 is constituted by a parallel circuit of an inductance element lpa1 and a capacitance element cpa3, and capacitance elements cpa2, cpa4 having capacitance with the ground. The parallel circuit of the inductance element lpa1 and the capacitance element cpa3 preferably has a resonance frequency, which is 2-3 times the transmitting frequency of 5-GHz-band wireless LAN.

A first balanced-unbalanced conversion circuit 12 is connected to a second port 6b of a second high-frequency switch circuit 6 via a matching circuit 1g. Because the matching circuit 1g is necessary for matching between the bandpass filter circuit 4 and the first balanced-unbalanced conversion circuit 12, it may be disposed between the second high-frequency switch circuit 6 and the bandpass filter circuit 4. The first balanced-unbalanced conversion circuit 12 is constituted by an unbalanced circuit comprising inductance elements lbg1 and lbg1a on the side of the second high-frequency switch circuit 6, and a balanced circuit comprising inductance elements lbg2 and Lbg3 and a capacitance element cbg1 on the side of the receiving circuits 11bg-R+ and 11bg-R− of 2.4-GHz-band wireless LAN. Ideally, signals having the same amplitude with a phase difference of 180° are output from 11bg-R+ and 11bg-R−. A capacitance element cbg1 is disposed between a connecting point of the inductance elements lbg2 and lbg3 and the ground, so that it appears short-circuited at high frequencies. DC voltage may be applied to a port DCg, such that DC voltage is output from the ports 11bg-R+ and 11bg-R−. The first balanced-unbalanced conversion circuit 12 may have an impedance-converting function.

A second balanced-unbalanced conversion circuit 13 is connected to a third port 6c of the second high-frequency switch circuit 6 via a matching circuit 1b. Because the matching circuit 1b is necessary for matching the bandpass filter circuit 4 and the second balanced-unbalanced conversion circuit 13, it may be disposed between the second high-frequency switch circuit 6 and the bandpass filter circuit 4. In this case, the matching circuit 1b and the matching circuit 1g may be formed into one matching circuit. The second balanced-unbalanced conversion circuit 13 is constituted by an unbalanced circuit comprising inductance elements lbb1 and lbb1a on the side of the second high-frequency switch circuit 6, and a balanced circuit comprising inductance elements lbb2 and lbb3 and a capacitance element cbb1 on the side of the transmitting/receiving circuit BLT-TR+, BLT-TR− of Bluetooth. Ideally, signals having the same amplitude with a phase difference of 180° are output from BLT-TR+ and BLT-TR−. A capacitance element cbb1 is disposed between a connecting point of the inductance elements lbg2 and lbg3 and the ground, so that it appears short-circuited at high frequencies. DC voltage may be applied to a port DCb, so that DC voltage is output from BLT-TR+ and BLT-TR−. The second balanced-unbalanced conversion circuit 13 may have an impedance-converting function.

Figure 15:
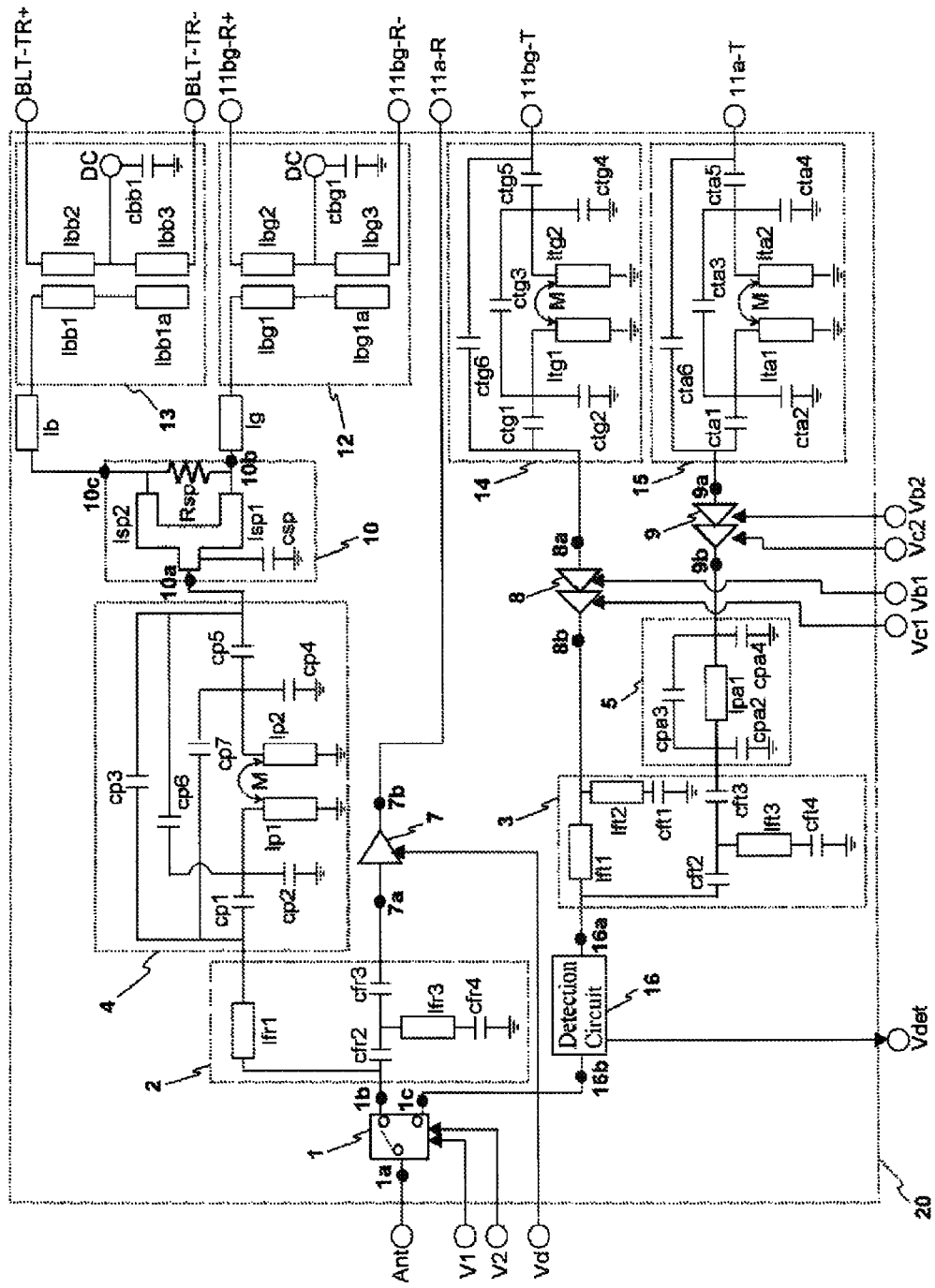
FIG. 15 is a view showing the equivalent circuit of the multiband high-frequency circuit shown in FIG. 6.

FIG. 15 shows an equivalent circuit of the high-frequency circuit shown in FIG. 6. This equivalent circuit is the same as shown in FIG. 14, except for comprising a power-dividing circuit 10 in place of the second high-frequency switch circuit 6. The power-dividing circuit 10 is constituted by transmission lines lsp1, lsp2, a capacitance element csp, and a resistance element Rsp. Signal power input to a first port 10a on the side of the first bandpass filter circuit 4 is substantially equally distributed to the second port 10b and the third port 10c, so that signal power, which is half the power input to the first port 10a, appears at the second port 10b and the third port 10c. The characteristic impedance of the transmission lines lsp1 and lsp2 is preferably set at about 70Ω. With the capacitance element csp connected to the first port 10a, the length of the transmission lines lsp1 and lsp2 can be shorter than ¼ wavelength. Rsp is preferably about 100Ω.

Figure 16:
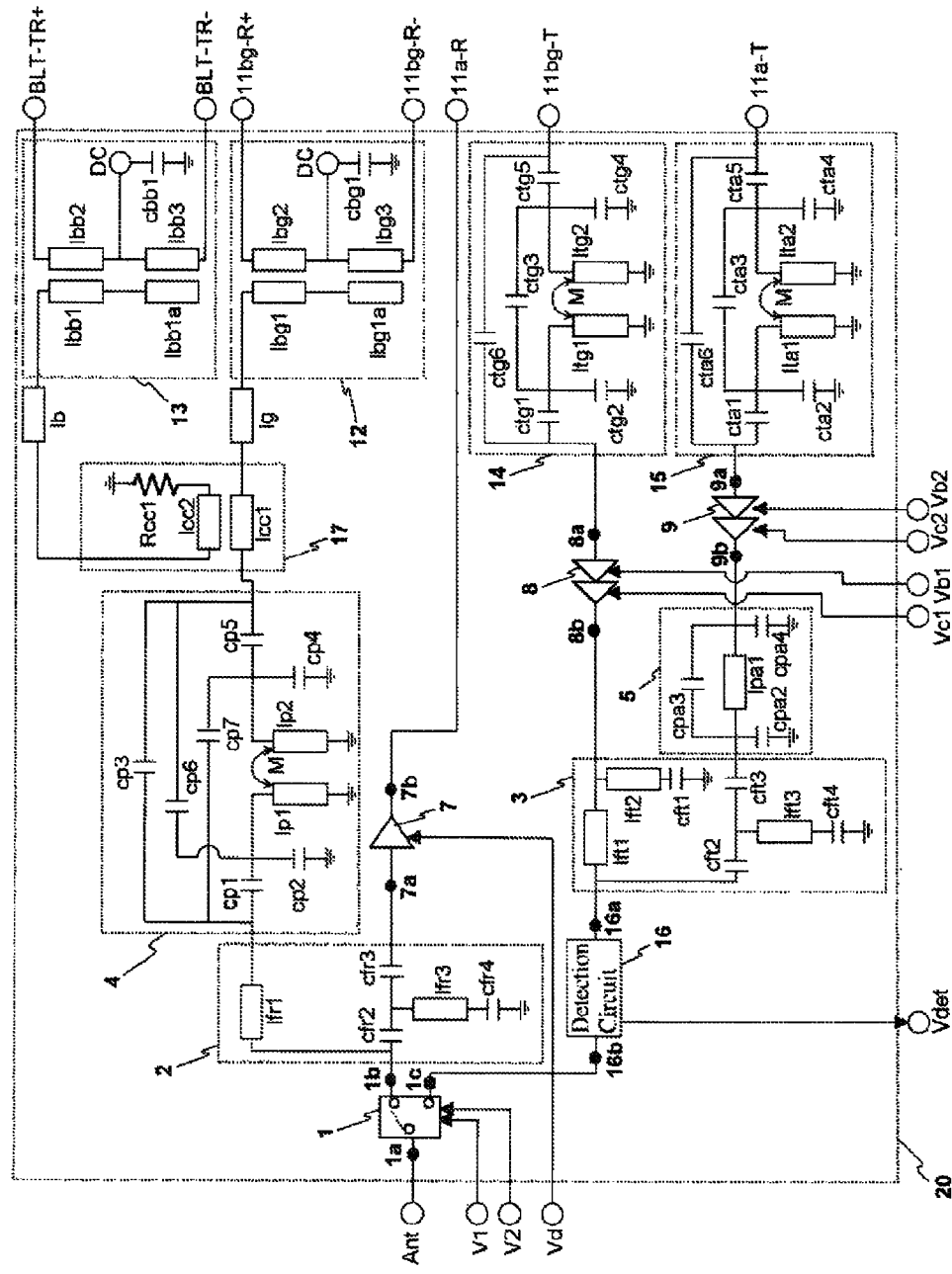
FIG. 16 is a view showing the equivalent circuit of the multiband high-frequency circuit shown in FIG. 11.

FIG. 16 shows an equivalent circuit of the high-frequency circuit shown in FIG. 11. This equivalent circuit is the same as shown in FIG. 14, except for comprising a coupler circuit 17 in place of the second high-frequency switch circuit 6. The coupler circuit 17 comprises a transmission line lcc1 as a main line, a transmission line lcc2 as a sub-line, and a resistance element Rcc1, the main line being coupled to the sub-line. The transmission line lcc1 as a main line is connected to the receiving circuit 11bg-R in the first communications system, and the transmission line lcc2 as a sub-line is connected to the transmitting/receiving circuit BLT-TR in the third communications system.

Figure 17:
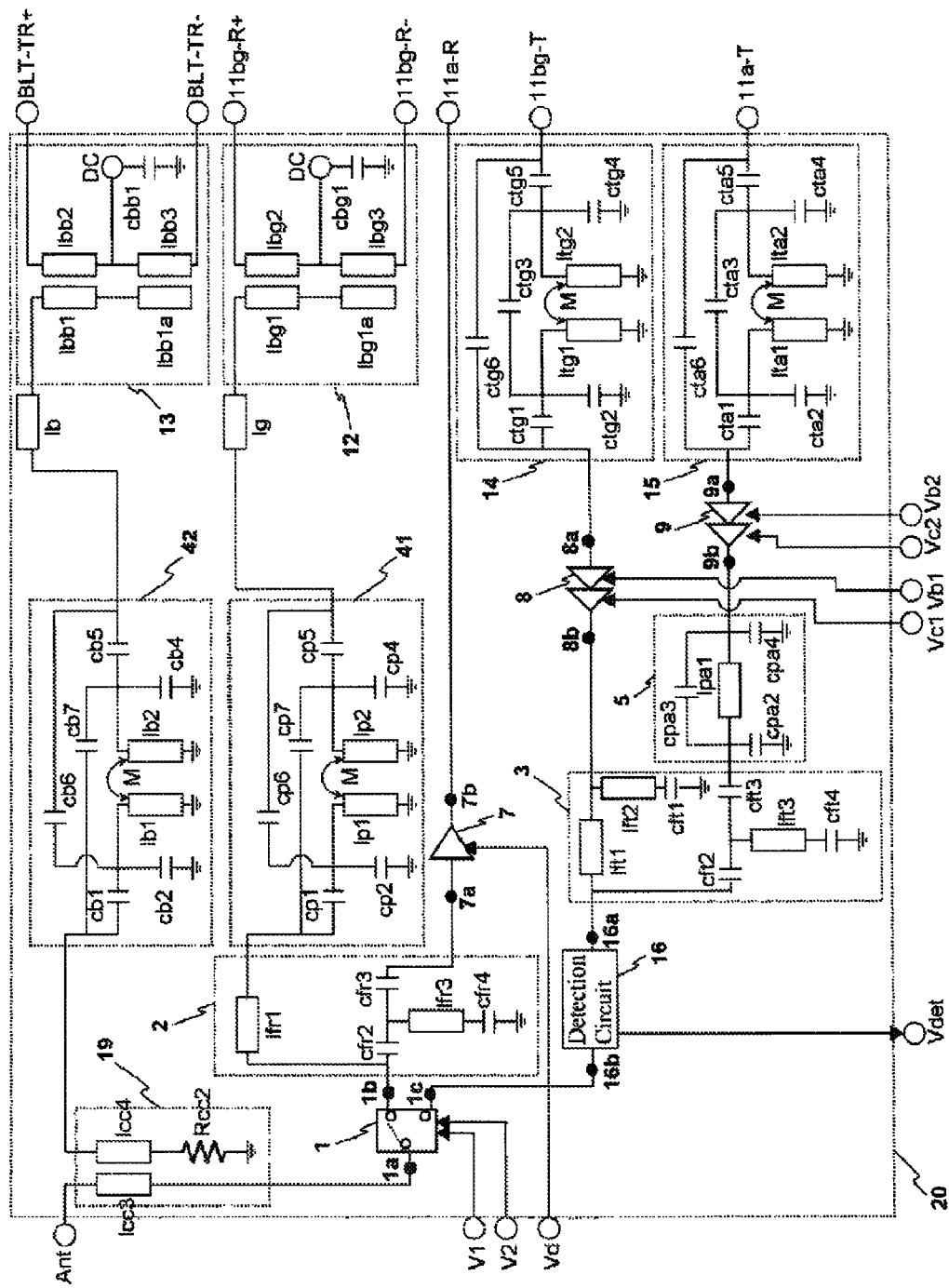
FIG. 17 is a view showing the equivalent circuit of the multiband high-frequency circuit shown in FIG. 13.

FIG. 17 shows an equivalent circuit of the high-frequency circuit shown in FIG. 13. This equivalent circuit is the same as shown in FIG. 14, except that the second high-frequency switch circuit 6 is removed, and that a coupler circuit 19 is disposed between the first high-frequency switch circuit 1 and the antenna. With the second high-frequency switch circuit 6 removed, a bandpass filter circuit 41 is connected to a balanced-unbalanced conversion circuit 12 via a matching circuit 1g. The bandpass filter circuit 41 does not have the capacitance element cp3 existing in the equivalent circuit shown in FIG. 14. Thus, the equivalent circuits in these embodiments may be properly modified.

The coupler circuit 19 is constituted by a transmission line lcc3 as a main line, a transmission line lcc4 as a sub-line, and a resistance element Rcc2, the main line being coupled to the sub-line. The transmission line lcc3 for the main line is connected to the antenna port Ant and a port 1a of the high-frequency switch circuit 1, and the transmission line lcc4 for the sub-line is connected to the bandpass filter circuit 42. A bandpass filter circuit 42 is connected to a balanced-unbalanced conversion circuit 13 via a matching circuit 1b. The bandpass filter circuit 42 is constituted by magnetically coupled inductance elements lb1 and lb2, and capacitance elements cb1, cb2, cb4, cb5, cb6, cb7. A parallel circuit of the inductance element lb1 and the capacitance element cb2 and a parallel circuit of the inductance element lb2 and the capacitance element cb4 preferably have resonance frequencies within the system frequency of Bluetooth.

Figure 18:
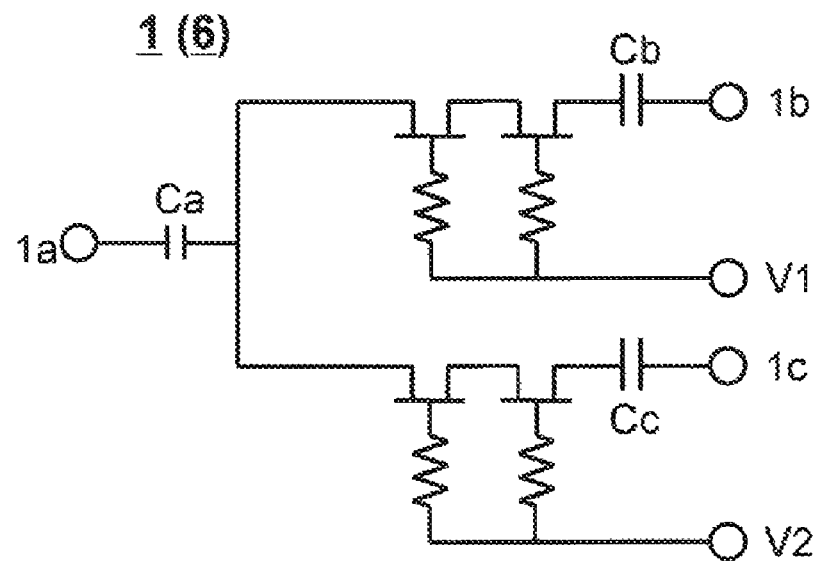
FIG. 18 is a view showing one example of the equivalent circuits of a high-frequency switch circuit (SPDT) used in the present invention.
Figure 19:
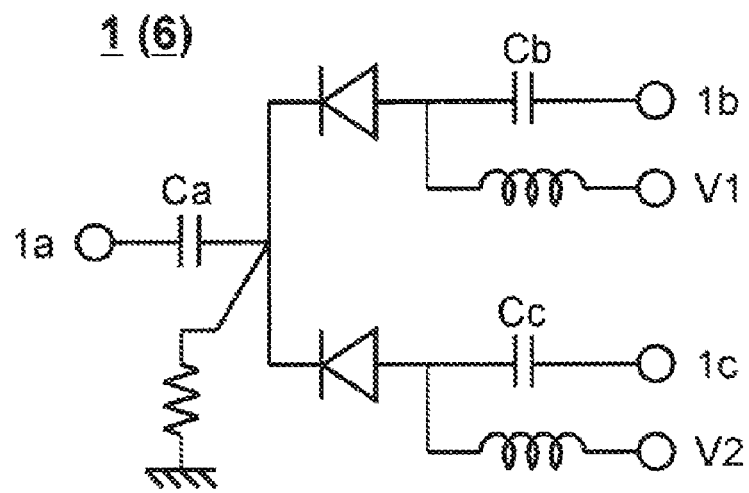
FIG. 19 is a view showing another example of the equivalent circuits of a high-frequency switch circuit (SPDT) used in the present invention.
Figure 20:
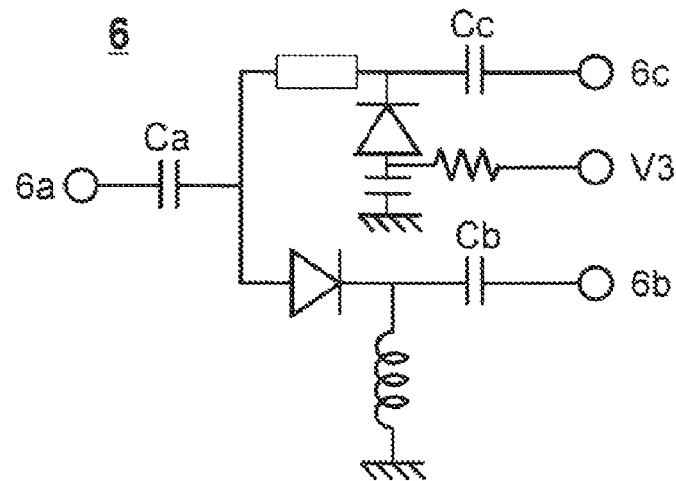
FIG. 20 is a view showing a further example of the equivalent circuits of a high-frequency switch circuit (SPDT) used in the present invention.

The equivalent circuits of the first high-frequency switch circuit 1 and the second high-frequency switch circuit 6 are exemplified in FIGS. 18-20. Parts are shown by usual symbols in each figure, with their detailed explanations omitted. In general, each of the high-frequency switch circuit 1, 6 is constituted by switching elements such as field effect transistors (FETs), diodes, etc. as main components, together with proper inductance elements and capacitance elements, exhibiting a single-pole, dual-throw (SPDT)-type switching function.

In the high-frequency switch circuits 1, 6 shown in FIGS. 18 and 19, ports are connected by voltage applied to control terminals V1, V2 as shown in Table 1. Usually, "High" has voltage of 2.5-4 V, and "Low" has voltage of 0-0.5 V in Table 1.

TABLE 1

| Connection Mode | V1 or V3 | V2 or V4 | Between 1a-1b or 6a-6b | Between 1a-1c or 6a-6c |
|---|---|---|---|---|
| 1 | High | Low | Connected | Disconnected |
| 2 | Low | High | Disconnected | Connected |

In the second high-frequency switch circuit 6 shown in FIG. 20, ports are connected by voltage applied to a control terminal V3 as shown in Table 2.

TABLE 2

| Connection Mode | V3 | Between 6a-6b | Between 6a-6c |
|---|---|---|---|
| 1 | High | Connected | Disconnected |
| 2 | Low | Disconnected | Connected |

In the equivalent circuit shown in FIG. 14, the transmitting circuit 11bg-T of 2.4-GHz-band wireless LAN and the transmitting circuit 11a-T of 5-GHz-band wireless LAN should be surely isolated from the transmitting/receiving circuit BLT-TR of Bluetooth in a transmitting mode. Accordingly, when the first port 1a is connected to the third port 1c in the first high-frequency switch circuit 1, control is made to connect the first port 6a to the second port 6b in the second high-frequency switch circuit 6. With respect to the first high-frequency switch circuit 1 and the second high-frequency switch circuit 6 having the equivalent circuit shown in FIG. 14, the relation between applied voltage and the connection of ports is shown in Table 3.

TABLE 3

| Connection Mode | V1 | V2 | V3 | V4 | Between 1a-6b | Between 1a-6c | Between 1a-1c |
|---|---|---|---|---|---|---|---|
| 11bg-R | High | Low | High | Low | Connected | Disconnected | Disconnected |
| BLT-TR | High | Low | Low | High | Disconnected | Connected | Disconnected |
| 11bg(a)-T | Low | High | High | Low | Disconnected | Disconnected | Connected |

Figure 21:
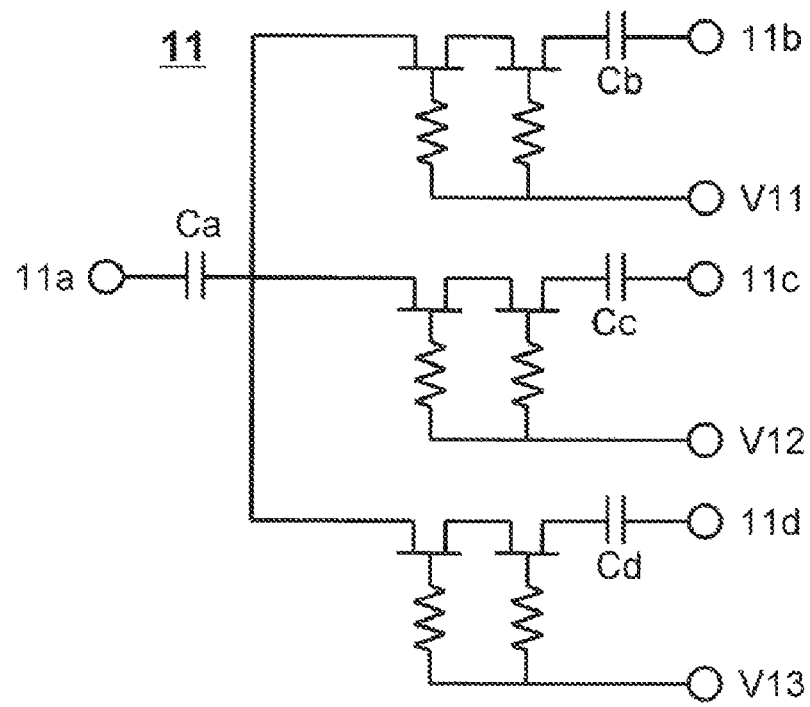
FIG. 21 is a view showing a still further example of the equivalent circuits of a high-frequency switch circuit (SP3T) used in the present invention.
Figure 22:
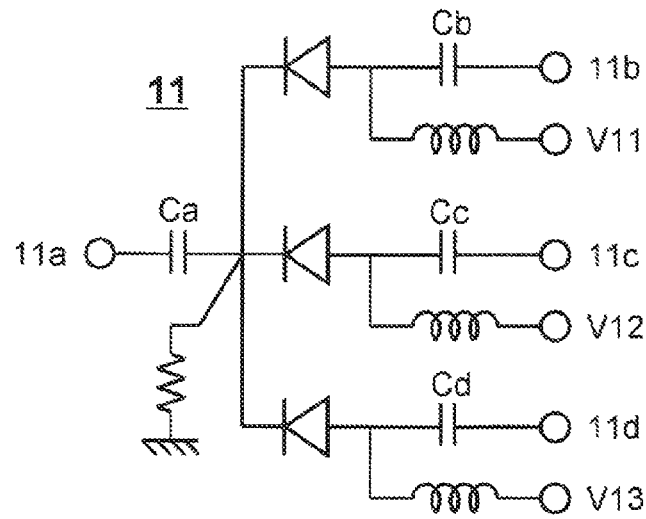
FIG. 22 is a view showing a still further example of the equivalent circuits of a high-frequency switch circuit (SP3T) used in the present invention.

FIGS. 21 and 22 show the equivalent circuits of a single-pole, 3-throw (SP3T)-type, high-frequency switch circuit 11 used in the multiband high-frequency circuits shown in FIGS. 4 and 7. Ports are connected by voltage applied to control terminals V11, V12, V13 as shown in Table 4.

TABLE 4

| Connection Mode | V11 | V12 | V13 | Between 11a-11b | Between 11a-11c | Between 11a-11d |
|---|---|---|---|---|---|---|
| 1 | High | Low | Low | Connected | Disconnected | Disconnected |
| 2 | Low | High | Low | Disconnected | Connected | Disconnected |
| 3 | Low | Low | High | Disconnected | Disconnected | Connected |

Figure 23:
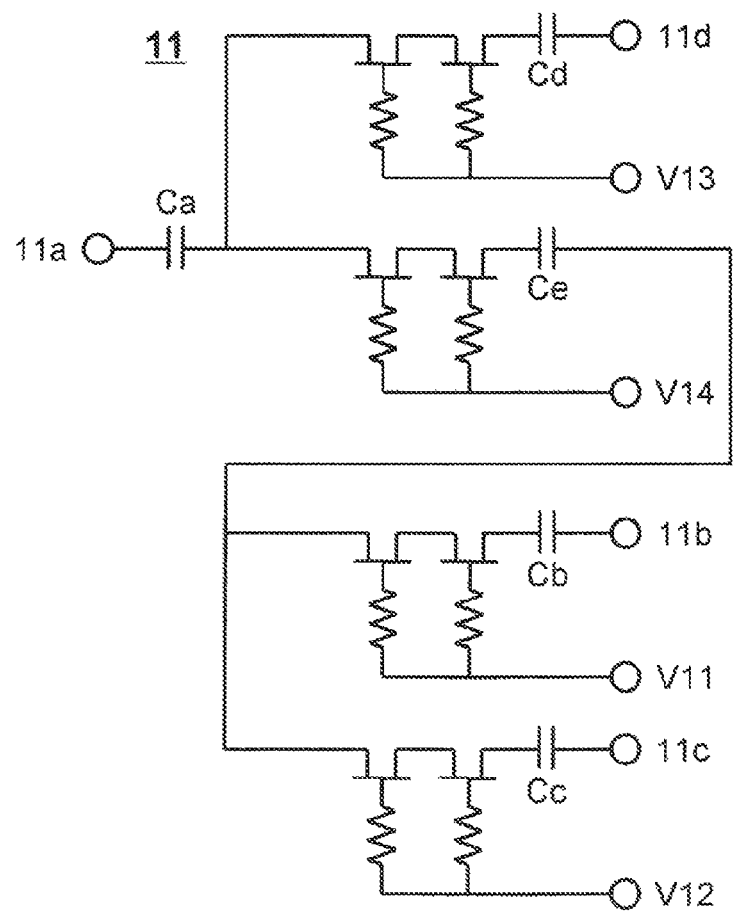
FIG. 23 is a view showing a still further example of the equivalent circuits of a high-frequency switch circuit (SP3T) used in the present invention.
Figure 24:
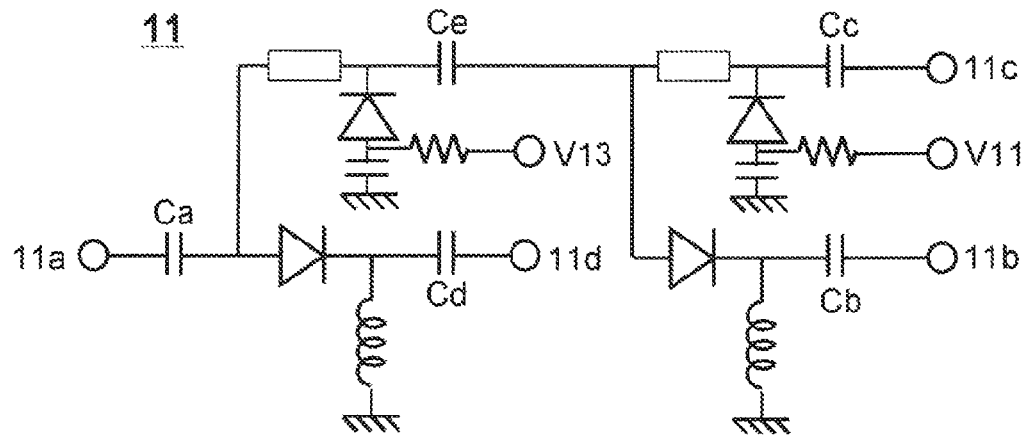
FIG. 24 is a view showing a still further example of the equivalent circuits of a high-frequency switch circuit (SP3T) used in the present invention.
Figure 25:
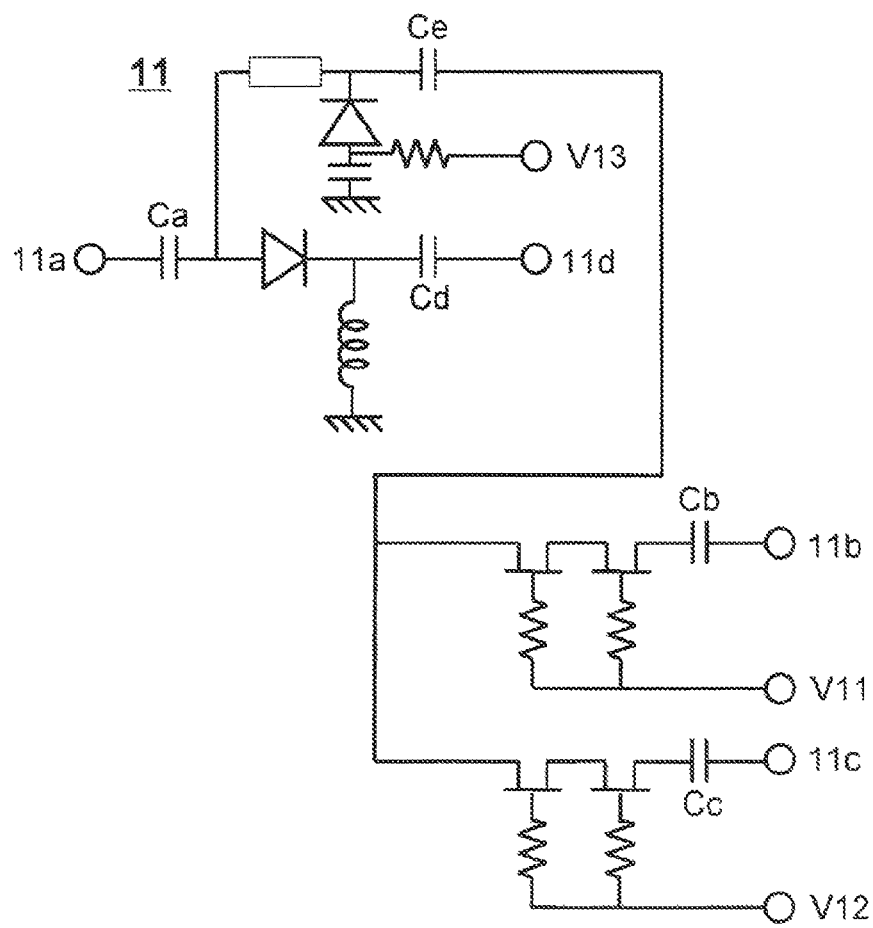
FIG. 25 is a view showing a still further example of the equivalent circuits of a high-frequency switch circuit (SP3T) used in the present invention.

In the high-frequency switch circuit 11 shown in FIGS. 21 and 22, the transmitting circuit 11bg-T of 2.4-GHz-band wireless LAN and the transmitting circuit 11a-T of 5-GHz-band wireless LAN may not be fully isolated from the transmitting/receiving circuit BLT-TR of Bluetooth. To achieve good isolation characteristics, the high-frequency switch circuit 11 is preferably constituted by connecting two-path-switching high-frequency switch circuits in series. Its examples are shown in FIGS. 23-25. In the third high-frequency switch circuit 11 shown in FIG. 23, ports are connected by voltage applied to control terminals V11, V12, V13, V14 as shown in Table 5. In the third high-frequency switch circuit 11 shown in FIG. 24, ports are connected by voltage applied to control terminals V11, V13 as shown in Table 6. In the third high-frequency switch circuit II shown in FIG. 25, ports are connected by voltage applied to control terminals V11, V12, V13 as shown in Table 7.

TABLE 5

| Connection Mode | V11 | V12 | V13 | V14 | Between 11a-11b | Between 11a-11c | Between 11a-11d |
|---|---|---|---|---|---|---|---|
| 1 | High | Low | Low | High | Connected | Disconnected | Disconnected |
| 2 | Low | High | Low | High | Disconnected | Connected | Disconnected |
| 3 | High | Low | High | Low | Disconnected | Disconnected | Connected |

TABLE 6

| Connection Mode | V11 | V13 | Between 11a-11b | Between 11a-11c | Between 11a-11d |
|---|---|---|---|---|---|
| 1 | High | Low | Connected | Disconnected | Disconnected |

TABLE 6-continued

| Connection Mode | V11 | V13 | Between 11a-11b | Between 11a-11c | Between 11a-11d |
|---|---|---|---|---|---|
| 2 | Low | Low | Disconnected | Connected | Disconnected |
| 3 | High | High | Disconnected | Disconnected | Connected |

TABLE 7

| Connection Mode | V11 | V12 | V13 | Between 11a-11b | Between 11a-11c | Between 11a-11d |
|---|---|---|---|---|---|---|
| 1 | High | Low | Low | Connected | Disconnected | Disconnected |
| 2 | Low | High | Low | Disconnected | Connected | Disconnected |
| 3 | High | Low | High | Disconnected | Disconnected | Connected |

Figure 26:
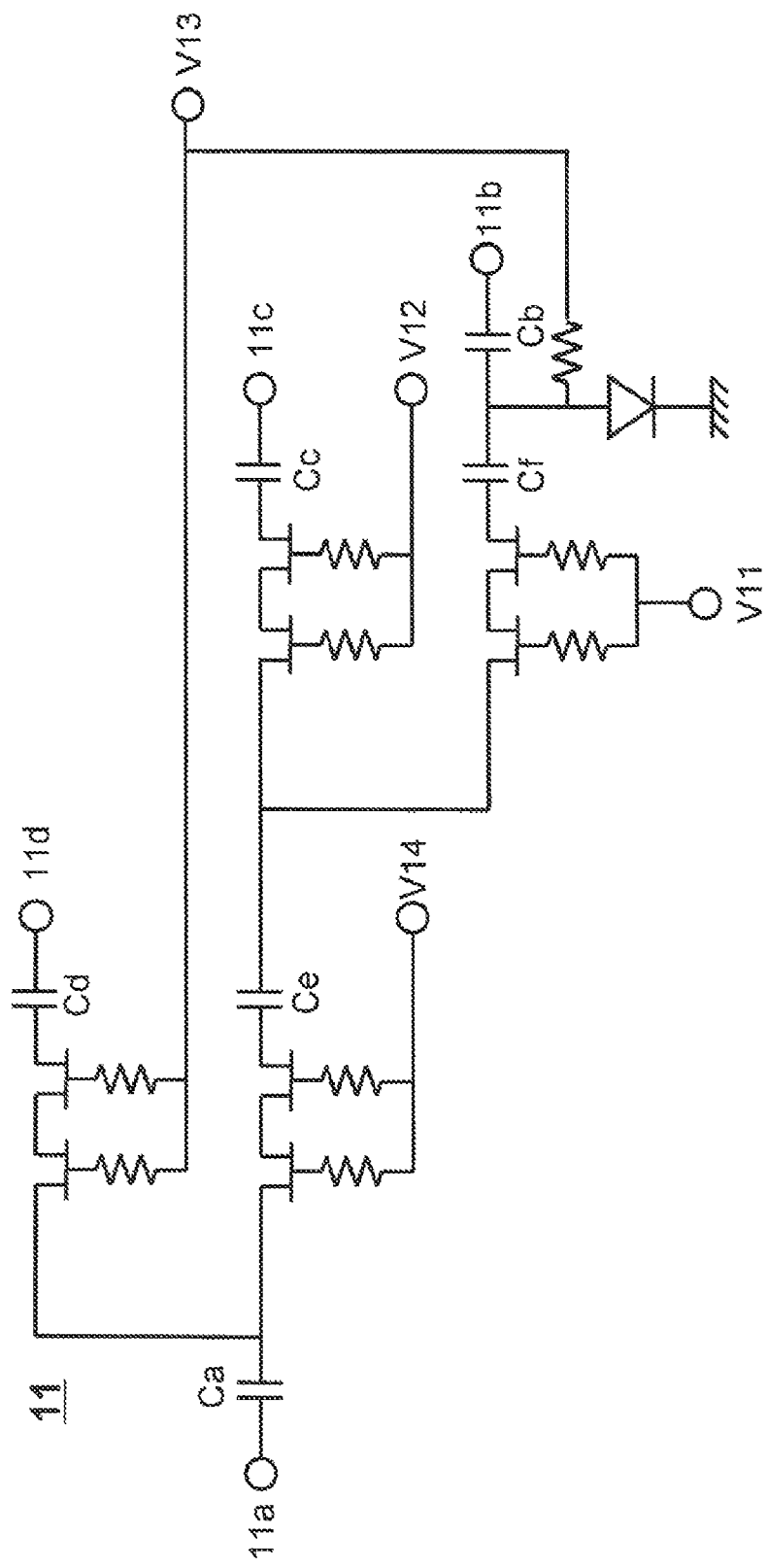
FIG. 26 is a view showing a still further example of the equivalent circuits of a high-frequency switch circuit (SP3T) used in the present invention.

Even in the high-frequency switch circuits 11 shown in FIGS. 23-25, the transmitting circuit 11bg-T of 2.4-GHz-band wireless LAN and the transmitting circuit 11a-T of 5-GHz-band wireless LAN may not be fully isolated from the receiving circuit 11bg-R of 2.4-GHz-band wireless LAN. To achieve good isolation characteristics, one-path switch circuit is preferably disposed, such that it is series-connected to a path between the first and second ports 11a and 11b of the high-frequency switch circuit 11 shown in FIGS. 23-25, or to the ground. Its example is shown in FIG. 26, in which a PIN diode is connected between the port 11b and the ground. In the high-frequency switch circuit 11 shown in FIG. 26, ports are connected by voltage applied to control terminals V11, V12, V13, V14 as shown in Table 5.

Figure 27:
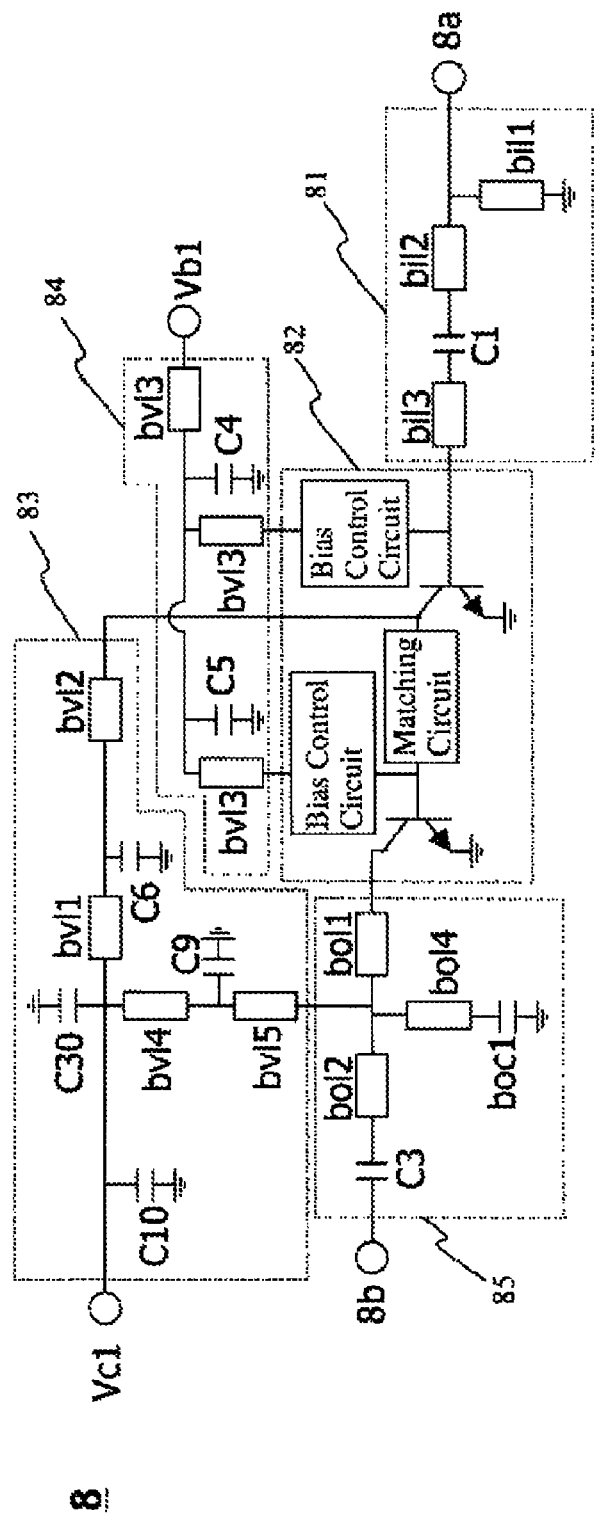
FIG. 27 is a view showing one example of the equivalent circuits of a high-frequency power amplifier for 2.4-GHz-band wireless LAN used in the present invention.

FIG. 27 shows one example of the equivalent circuits of the first high-frequency power amplifier 8 shown in FIG. 14, which is connected between the transmitting circuit 11bg-T of 2.4-GHz-band wireless LAN and the lower-frequency-side filter circuit of the second diplexer circuit 3. This high-frequency power amplifier 8 comprises an input matching circuit 81, a power-amplifying circuit 82 constituted by two-stage transistors, a circuit 83 for supplying a constant voltage, a bias control circuit 84 for controlling the output power of the first high-frequency power amplifier 8, and an output-matching circuit 85. Inductance elements and capacitance elements are used in each circuit 81-85. Alternatively, each circuit 81-85 may be formed into a microwave monolithic integrated circuit (MMIC).

Figure 28:
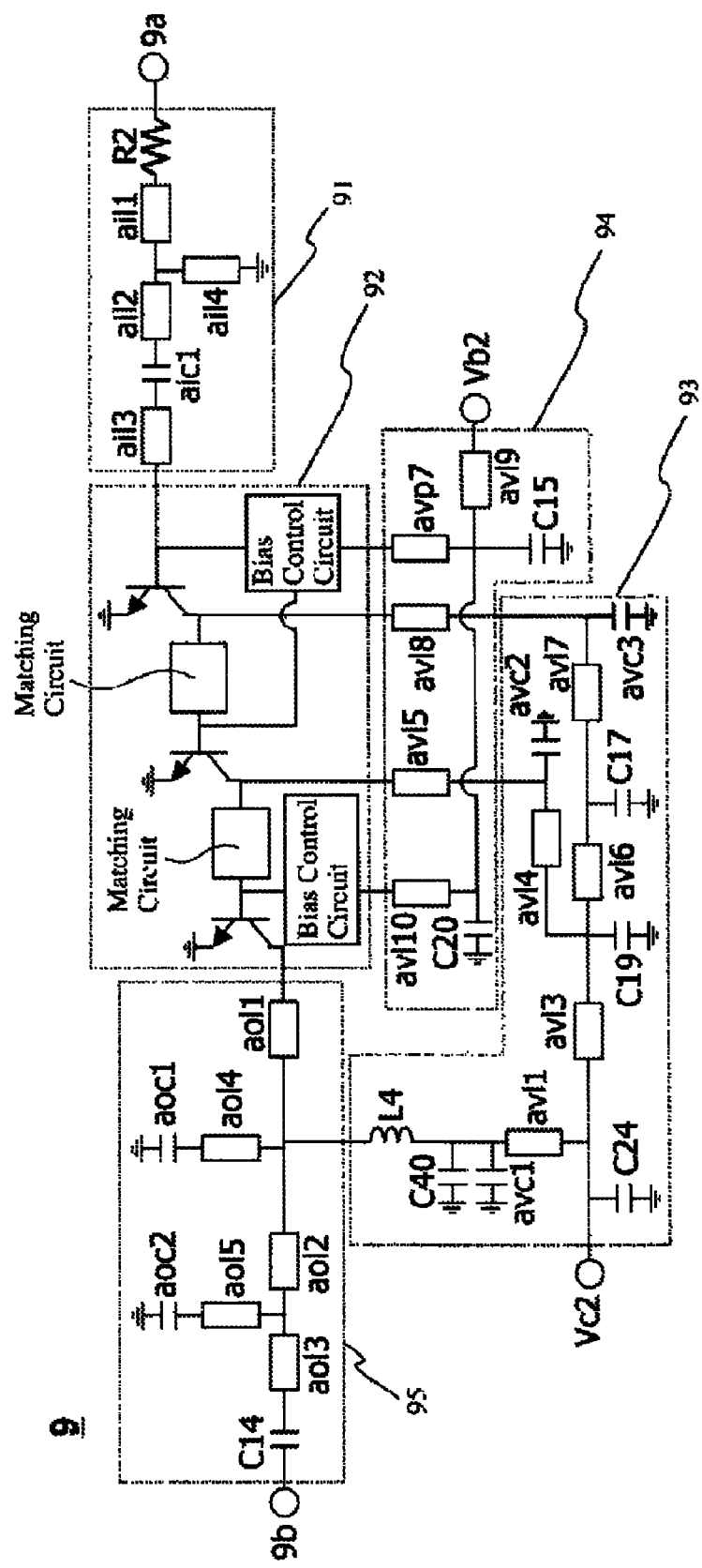
FIG. 28 is a view showing one example of the equivalent circuits of a high-frequency power amplifier for 5-GHz-band wireless LAN used in the present invention.

FIG. 28 shows one example of the equivalent circuits of the second high-frequency power amplifier 9 shown in FIG. 14, which is connected between the transmitting circuit 11a-T of 5-GHz-band wireless LAN and the higher-frequency-side filter circuit of the second diplexer circuit 3. This high-frequency power amplifier 9 comprises an input matching circuit 91, a power-amplifying circuit 92 constituted by three-stage transistors, a circuit 93 for supplying a constant voltage, a bias control circuit 94 for controlling the output power of the second high-frequency power amplifier 9, and an output-matching circuit 95. Inductance elements and capacitance elements are used in each circuit 91-95. Alternatively, each circuit 91-95 may be formed into MMIC.

Figure 29:
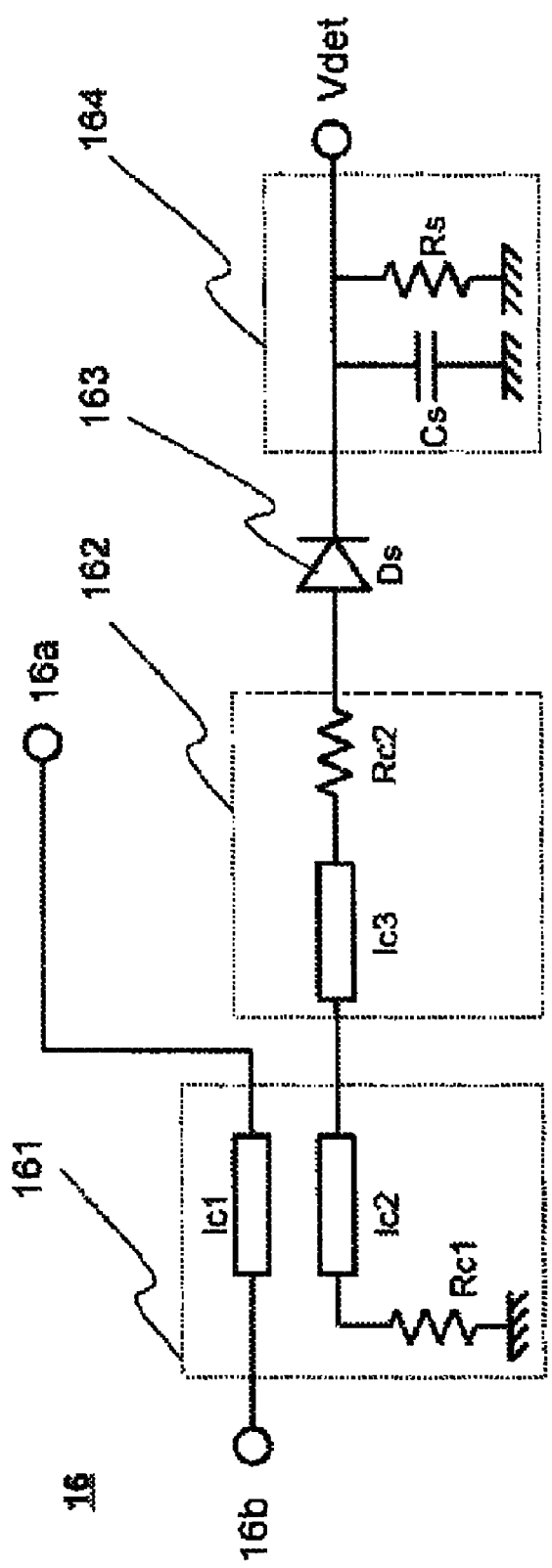
FIG. 29 is a view showing one example of the equivalent circuits of a detection circuit used in the present invention.

FIG. 29 shows one example of the equivalent circuits of the detection circuit 16 shown in FIG. 14, which is disposed between the second diplexer circuit 3 and the antenna port Ant. This detection circuit 29 comprises a directional coupler 161 constituted by a main line lc1, a sub-line lc2 and a terminal resistor Rc1, a Schottky diode (Ds) 163, a matching circuit 162 comprising a phase circuit lc3 and a resistor Rc2 and connected between the directional coupler 161 and the Schottky diode 163, and a voltage-smoothing circuit 164 comprising a resistor Rs and a capacitance element Cs. The directional coupler 161 may be constituted by capacitors. The resistor Rc2 has a function of attenuating harmonics generated by the Schottky diode Ds. DC voltage depending on the output power of the first or second high-frequency power amplifier 8, 9 is output from the output voltage port (Vdet) of the detection circuit 16.

[2] Multiband High-Frequency Circuit Device

Figure 30:
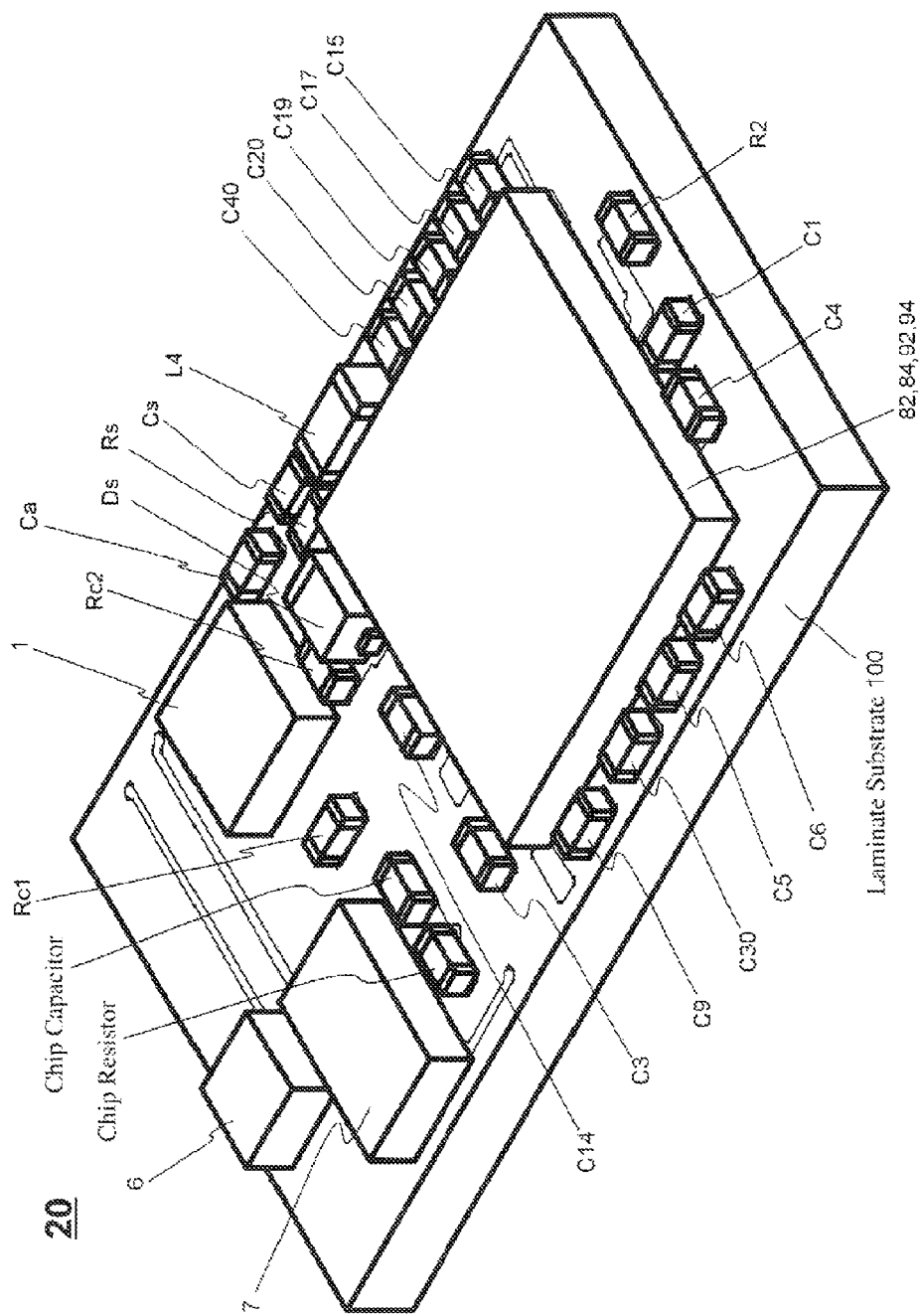
FIG. 30 is a perspective view showing the appearance of a multiband high-frequency circuit device (laminate substrate) comprising the multiband high-frequency circuit according to one embodiment of the present invention.
Figure 31:
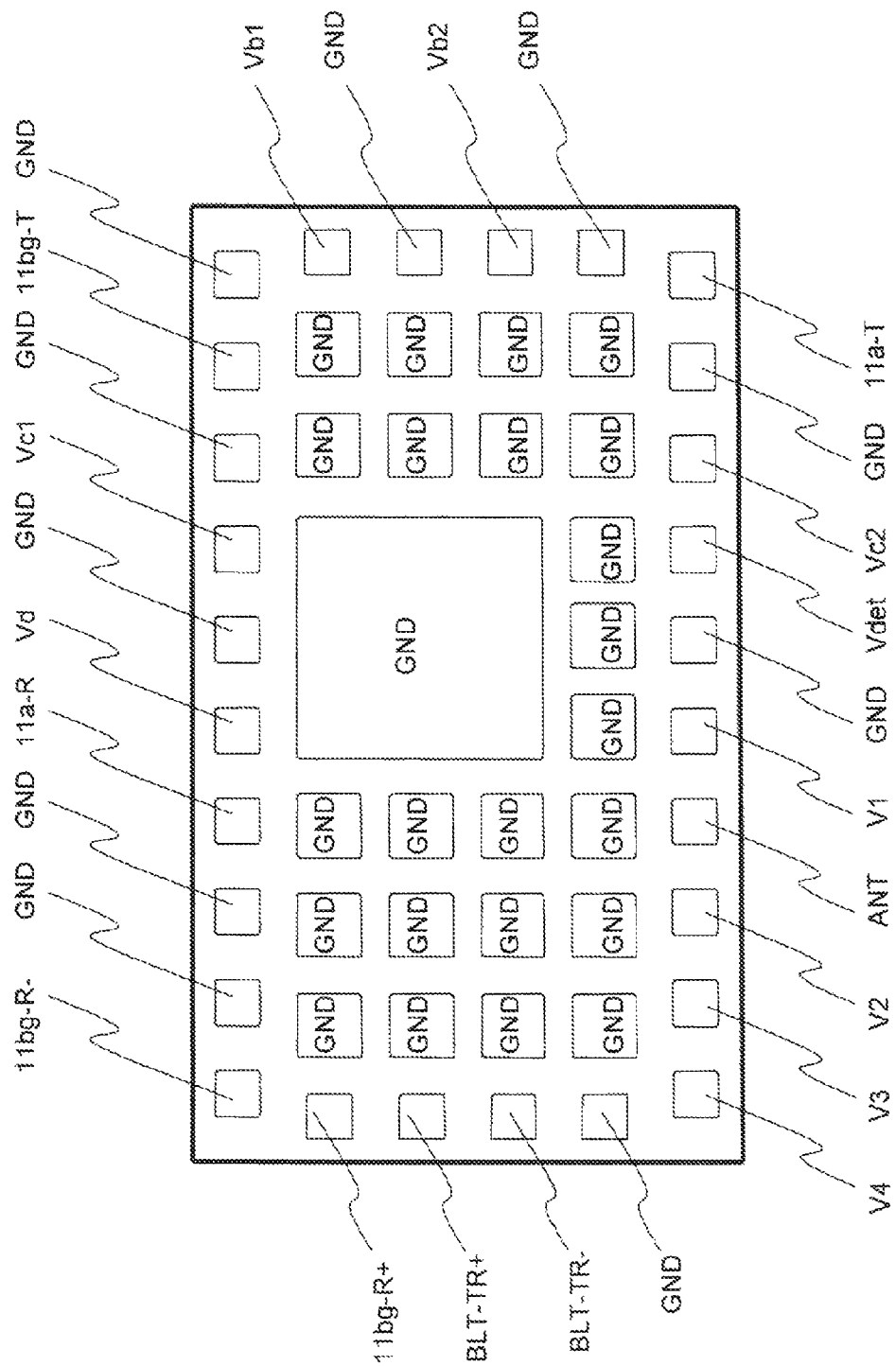
FIG. 31 is a plan view showing a rear surface of a laminate substrate constituting a multiband high-frequency circuit device comprising the multiband high-frequency circuit according to one embodiment of the present invention.
Figure 32A:
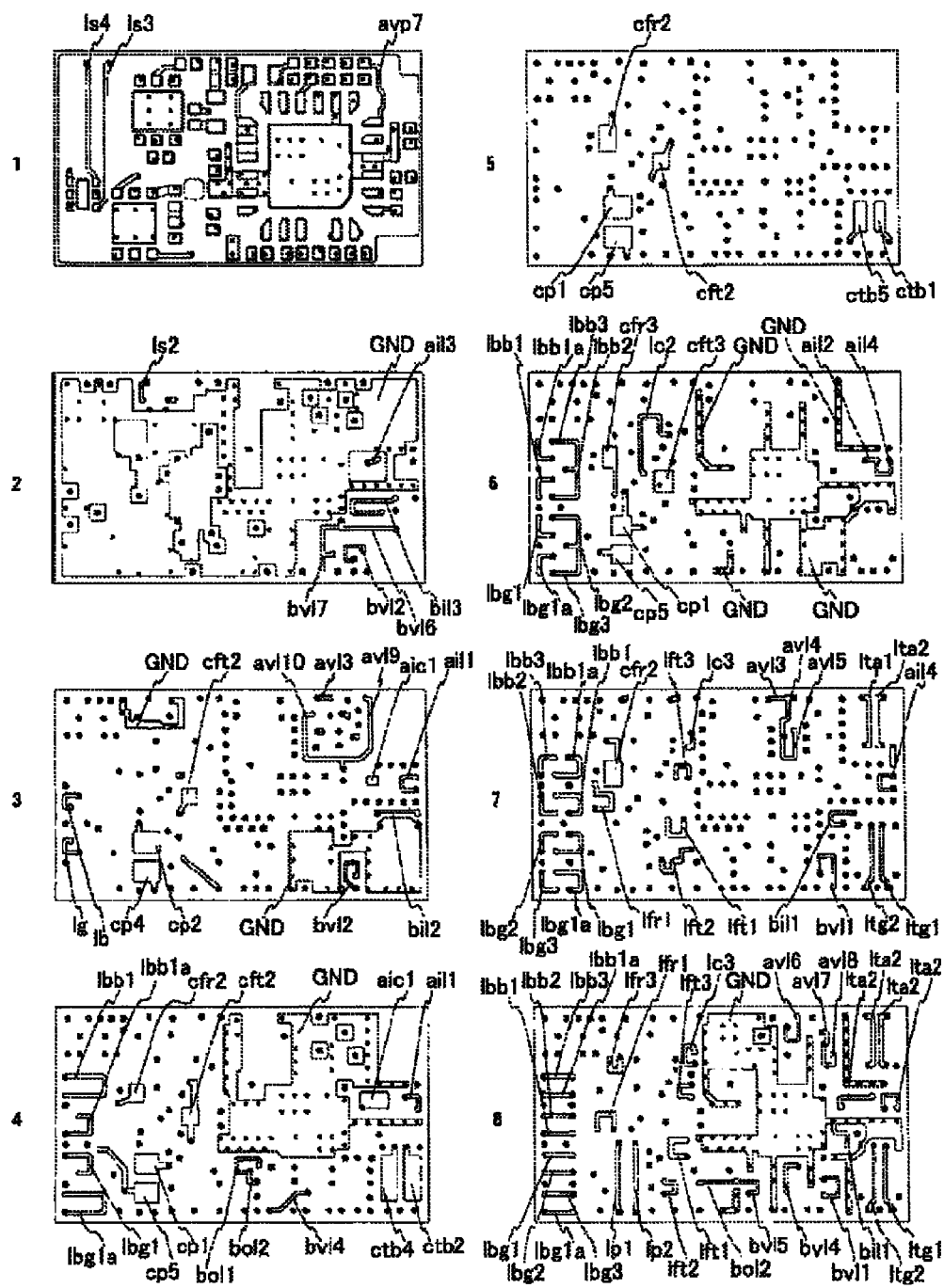
FIG. 32(a) is a development showing part of a laminate substrate constituting a multiband high-frequency circuit device comprising the multiband high-frequency circuit shown in FIG. 5.
Figure 32B:
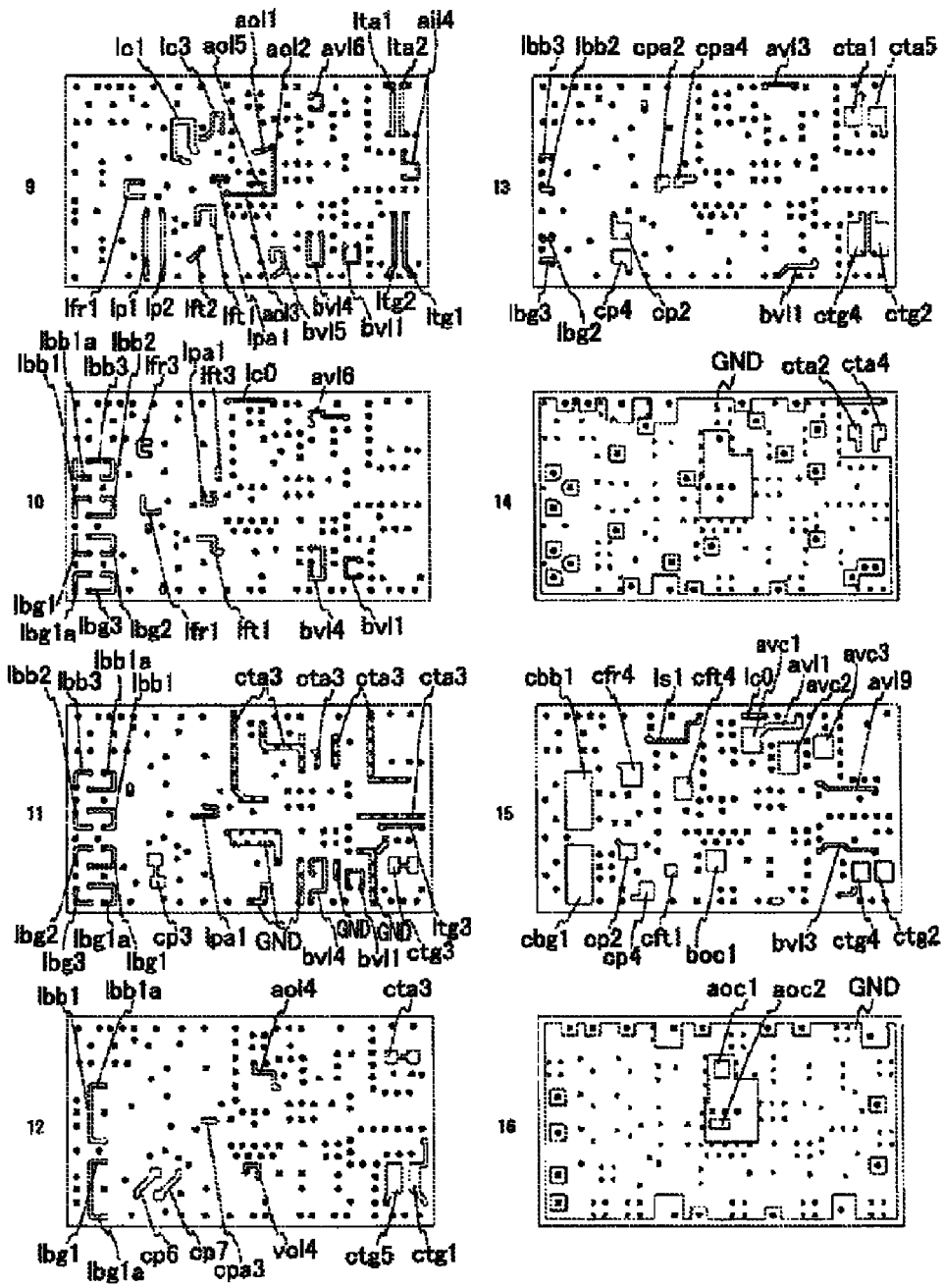
FIG. 32(b) is a development showing another part of a laminate substrate constituting a multiband high-frequency circuit device comprising the multiband high-frequency circuit shown in FIG. 5.

Taking for example a case where the multiband high-frequency circuit device of the present invention is a laminate device, a device comprising a ceramic laminate substrate, detailed explanation will be made below. FIG. 30 shows the appearance of a laminate substrate 100 constituting a multiband high-frequency circuit device 20 comprising the multiband high-frequency circuit of the present invention, FIG. 31 shows a rear surface of the laminate substrate 100, FIGS. 32(a) and 32(b) show layers constituting the laminate substrate 100 for the high-frequency circuit device shown in FIG. 30, which corresponds to the multiband high-frequency circuit shown in FIG. 5, and to the equivalent circuit shown in FIG. 14. This high-frequency circuit device 20 comprises a first high-frequency switch circuit (SPDT1) 1, a first diplexer circuit (Dip1) 2, a second diplexer circuit (Dip2) 3, a bandpass filter circuit (BPF1) 4, a lowpass filter circuit (LPF) 5, a second high-frequency switch circuit (SPTD2) 6, a low-noise amplifier (LNA) 7, a first high-frequency power amplifier (PA1) 8, a second high-frequency power amplifier (PA2) 9, a first balanced-unbalanced conversion circuit (BAL1) 12, a second balanced-unbalanced conversion circuit (BAL2) 13, a bandpass filter circuit (BPF4) 14, a bandpass filter circuit (BPF5) 15, and a detection circuit (DET) 16.

The laminate substrate 100 can be produced, for instance, by forming green sheets as thick as 10-200 μm made of dielectric ceramic materials, LTCC (low-temperature co-fired ceramics), which are sinterable at as low temperatures as 1000° C. or lower, providing each green sheet with through-holes, filling the through-holes with a conductive paste of Ag, Cu, etc. to form via-holes, and printing the green sheet with a low-resistivity conductive paste of Ag, Cu, etc. to form predetermined electrode patterns, integrally laminating pluralities of green sheets provided with these electrode patterns and/or via-holes, which may include green sheets having no electrode patterns, and sintering the resultant laminate.

The dielectric ceramic materials are preferably, for instance, (a) ceramic materials comprising Al, Si, Sr, etc. as main components, and Ti, Bi, Cu, Mn, Na, K, etc. as sub-components, (b) ceramic materials comprising Al, Si, Sr, etc. as main components, and Ca, Pb, Na, K, etc. as sub-components, (c) ceramic materials comprising Al, Mg, Si, Gd, etc., (d) ceramic materials comprising Al, Si, Zr, Mg, etc. and having dielectric constants of about 5-15. In addition to the dielectric ceramic materials, resins and composites of resins and dielectric ceramic powder may be used. Also, green sheets of $Al_2O_3$-based, dielectric ceramic materials may be printed with conductive pastes of high-temperature-sinterable metals, such as tungsten, molybdenum, etc., and co-fired at high temperatures (HTCC technology).

In the depicted embodiment, the laminate substrate 100 comprises green sheets 1-16 in this order from above, 16 layers in total. An upper surface of the green sheet 1 is provided with pluralities of land electrodes for mounting chip parts that are not contained in the laminate substrate 100. As shown in FIG. 30, mounted on these electrodes are a first high-frequency switch circuit 1, a second high-frequency switch circuit 6, a low-noise amplifier 7, an MMIC integrally comprising a power-amplifying circuit 82 for constituting a first high-frequency power amplifier 8, a bias control circuit 84, a power-amplifying circuit 92 for constituting a second high-frequency power amplifier 9 and a bias control circuit 94, chip capacitors C1, C3, C4, C5, C6, C9, C30 for constituting the first high-frequency power amplifier 8, chip capacitors C14, C15, C17, C19, C20, C40 for constituting the second high-frequency power amplifier 9, a chip inductor L4 and a chip resistor R2, a Schottky diode Ds, chip resistors Rs, Rc1, Rc2, and a chip capacitor Cs for constituting a detection circuit 16. Lines ls3, ls4 connect the second high-frequency switch circuit 6 to the control terminals V3, V4. A transmission line avp7 is disposed between the power-amplifying circuit 92 and the chip capacitor C15 of the second high-frequency power amplifier 9. The above land electrodes are connected to connecting lines and circuit elements contained in the laminate substrate 100 through via-holes.

Switch circuits may be mounted on the land electrodes of the laminate substrate 100 in a bare state, and sealed by a resin or a pipe. Constituted as the laminate substrate, the high-frequency circuit device can be miniaturized. An RFIC and a baseband IC for constituting the transmitting/receiving circuit may be mounted to the laminate substrate 100.

Figure 32B:
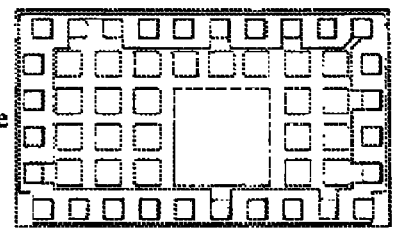

FIGS. 32($a$) and 32($b$) show the internal structure of the laminate substrate 100. Line electrodes, capacitor electrodes and ground electrodes are properly formed on sheets 2-16, and connected through via-holes (indicated by rounds in the figures) formed in the sheets. A wide ground electrode GND is formed on a sheet 16, a lowermost layer. As shown in FIG. 31, terminal electrodes to be mounted to a circuit board are formed on a rear surface of the sheet 16. In portions on which the high-frequency power amplifiers 8, 9 are mounted, thermal-vias are formed from the top surface to the rear surface to increase heat dissipation. To suppress unnecessary noise irradiation, wide ground electrodes GND are formed on the sheets 2, 14 and 16.

Because transmission line patterns and capacitor electrode patterns formed on each sheet bear the same reference numerals as in FIGS. 14, 27, 28 and 29, their detailed explanations will be omitted. Circuits are three-dimensionally formed on the laminate substrate 100. To prevent unnecessary electromagnetic interference among electrode patterns constituting the circuits, it is preferable to separate the electrode patterns from each other by ground electrodes GND and via-holes, or to dispose circuit-constituting electrode patterns without overlapping in a lamination direction. Specifically, if isolation were insufficient among the input part, voltage-supplying part and output part of the high-frequency power amplifier, malfunction and oscillation would likely occur in the high-frequency power amplifier. To achieve their isolation fully, for instance, the sheets 2, 4, 6, 8, 14 and 16 are properly provided with planar ground electrodes and via-holes connected to ground electrodes.

Electrodes (for instance, capacitor electrodes cp1-cp7 formed on the sheets 3-6 and 11-15, and transmission lines lp1, lp2 formed on the sheets 8 and 9) constituting the first bandpass filter circuit 4 are preferably as separate as possible from mounted parts and electrodes (transmission lines bvl, bil, bol formed substantially in the lower right portion of the sheet, and transmission lines avl, ail, aol formed substantially in the upper right portion of the sheet) constituting the high-frequency power amplifiers 8, 9. This provides a bandpass filter resistant to unnecessary noise from the high-frequency power amplifier and having good attenuation characteristics. Similarly, electrodes (transmission line lbg, capacitor electrode cbg, transmission line lbb and capacitor electrode cbb formed substantially in the left side of a sheet) constituting the first and second balanced-unbalanced conversion circuits 12, 13 disposed in the receiving paths of 2.4-GHz-band wireless LAN and Bluetooth are preferably as separate as possible from the high-frequency power amplifier. This reduces unnecessary noises generated by the high-frequency power amplifier, thereby enhancing receiving sensitivity.

As shown in FIG. 31, a large ground electrode GND is formed substantially in a center portion of the rear surface of the laminate substrate 100, and small ground electrodes GND are formed around it. Disposed along four sides of the laminate substrate 100 are terminal electrodes for an antenna port (Ant), transmitting port (11$bg$-T) and receiving ports (11$bg$-R+, 11$bg$-R−) of 2.4-GHz-band wireless LAN, transmitting port (11$a$-T) and receiving port (11$a$-R) of 5-GHz-band wireless LAN, transmitting and receiving ports (BLT-TR+, BLT-TR−) of Bluetooth, ground port (GND), control ports (V1, V2, V3, V4) for controlling the first and second high-frequency switch circuits, power source ports (Vc1, Vb1, Vc2, Vb2) for the high-frequency power amplifiers, a power source port (Vd) for the low-noise amplifier, and an output voltage port (Vdet) for the detection circuit. Each terminal electrode is indicated by the same reference numeral as shown in FIG. 14. In this embodiment, the terminal electrodes are in a land grid array (LGA), but a ball grid array (BGA) may be used.

Figure 33A:
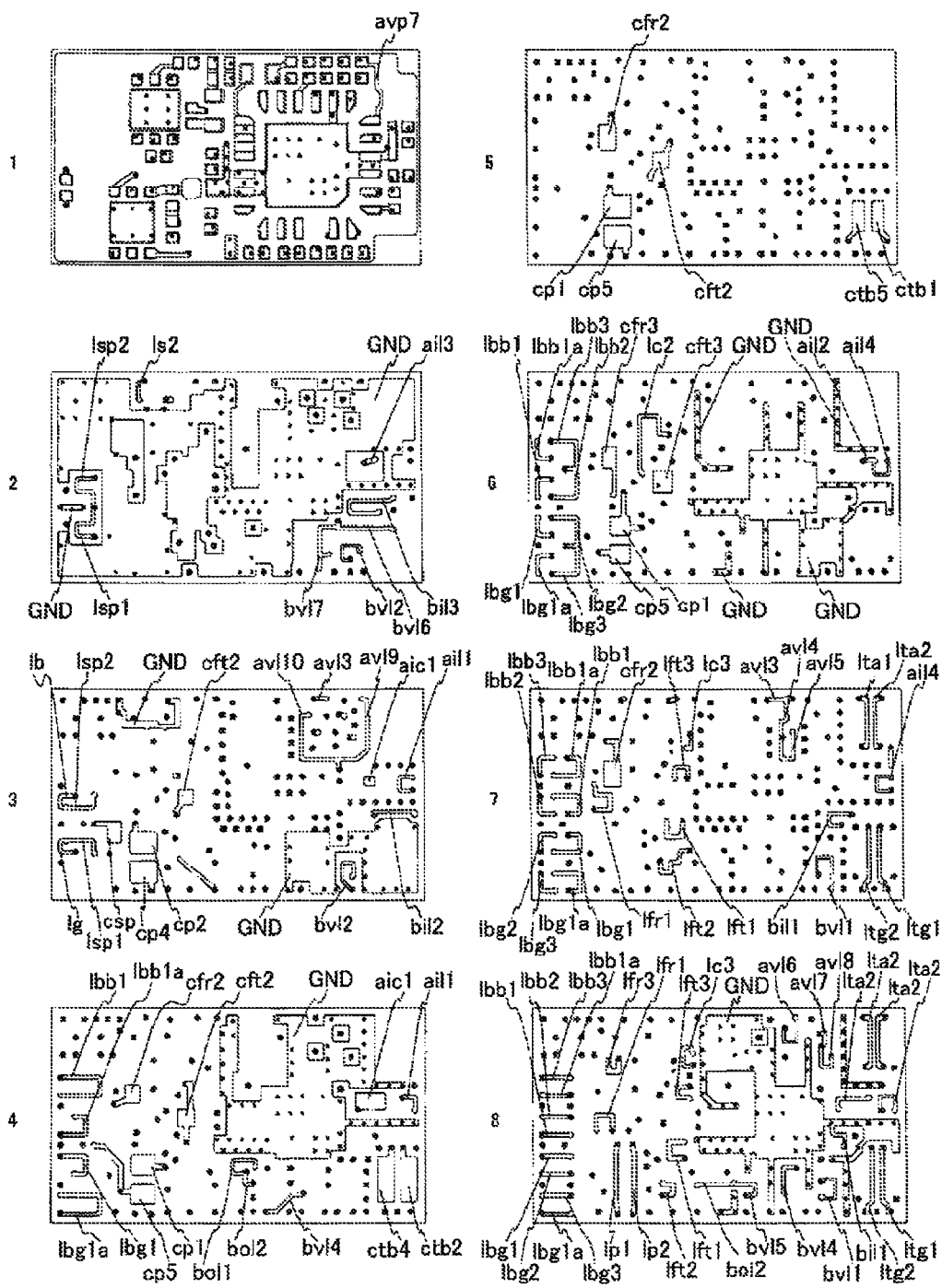
FIG. 33(a) is a development showing part of a laminate substrate constituting a multiband high-frequency circuit device comprising the multiband high-frequency circuit shown in FIG. 6.
Figure 33B:
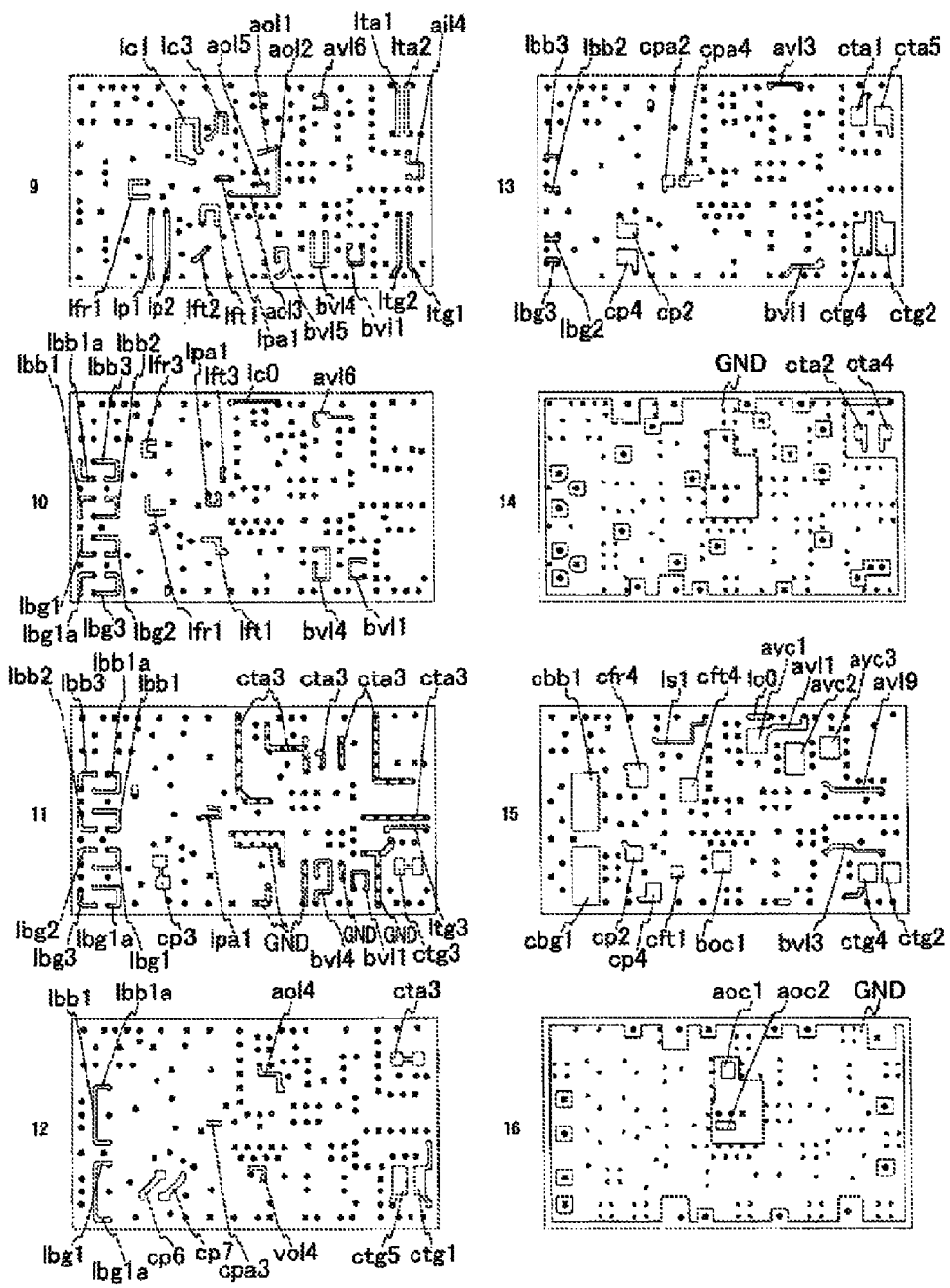
FIG. 33(b) is a development showing another part of a laminate substrate constituting a multiband high-frequency circuit device comprising the multiband high-frequency circuit shown in FIG. 6.
Figure 33B:
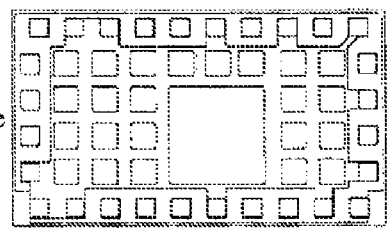
Figure 34:
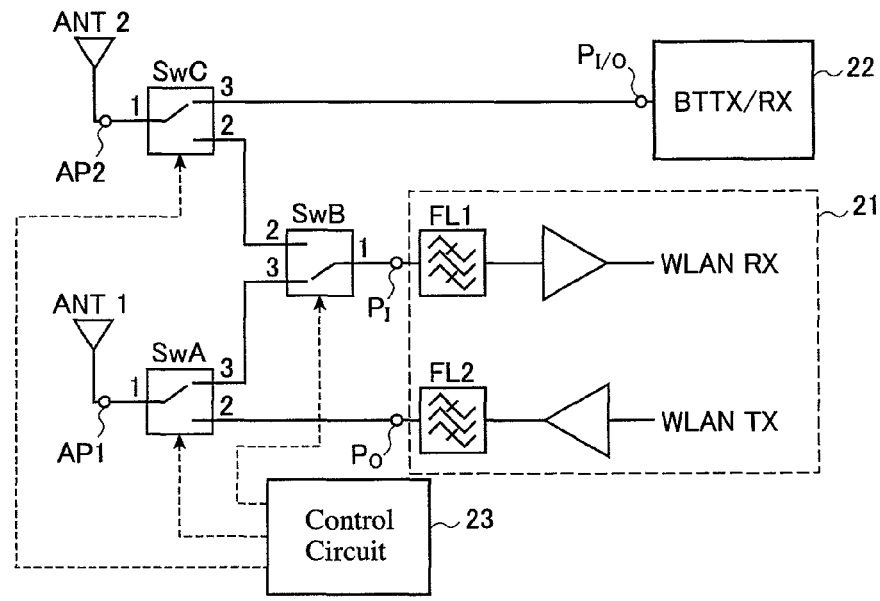
FIG. 34 is a block diagram showing a conventional communications apparatus usable for both 2.4-GHz-band wireless LAN and Bluetooth.
Figure 35:
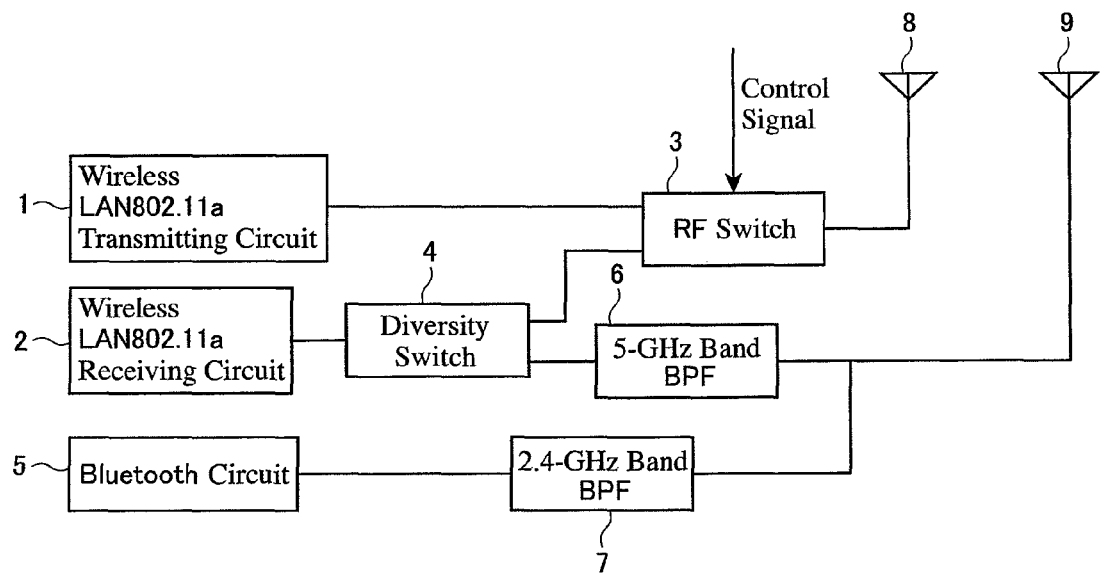
FIG. 35 is a block diagram showing a conventional communications apparatus usable for both 5-GHz-band wireless LAN and Bluetooth.

FIGS. 33($a$) and 33($b$) are developments showing the laminate substrate of a high-frequency circuit device having the equivalent circuit shown in FIG. 15 (corresponding to the multiband high-frequency circuit shown in FIG. 6). As described above, the high-frequency circuit shown in FIG. 6 is the same as shown in FIG. 5, except that the second high-frequency switch circuit is changed to a power-dividing circuit 10. The power-dividing circuit 10 is constituted by transmission lines lsp1, lsp2, a capacitor csp, and a resistor Rsp that is a mounted part. Electrode patterns for the transmission lines lsp1, lsp2 and the capacitor csp are formed on the sheets 2 and 3. The transmission line electrodes lsp1, lsp2 and the capacitor electrode csp are disposed above electrodes constituting the first and second balanced-unbalanced conversion circuits 12, 13, namely, above the transmission lines lbg, lbb and the capacitor electrodes cbg, cbb formed on the left side of the sheets. This suppresses noises and enables miniaturization. A line may constitute both of the balanced-unbalanced conversion circuit and the power-dividing circuit. Because the same reference numerals as in the above embodiment are given to the other electrodes, their explanation will be omitted. Other high-frequency circuit devices than described above may be, of course, constituted by laminate substrates.

EFFECT OF THE INVENTION

The present invention provides a multiband high-frequency circuit, a multiband high-frequency circuit device, and a multiband communications apparatus having the circuit, which have such small numbers of parts that can be miniaturized, and are usable in at least three communications systems (for instance, IEEE802.11b and/or IEEE802.11g using a 2.4-GHz band of wireless LAN, Bluetooth, and IEEE802.11a and/or IEEE802.11h using a 5-GHz band of wireless LAN).

The use of the above multiband high-frequency circuit, and a multiband high-frequency circuit device comprising it in a laminate substrate as an RF front-end circuit commonly used for at least three communications systems [for instance, 2.4-GHz-band wireless LAN (IEEE802.11b and/or IEEE802.11g), Bluetooth, and 5-GHz-band wireless LAN (IEEE802.11a and/or IEEE802.11h) as shown in FIG. 1] provides a small multiband communications apparatus. The communications systems are not restricted to the above frequency bands and communications standards, but may be used for various communications systems. Also, they are not restricted to three communications systems, but may be applied to large numbers of communications systems, for instance, with high-frequency switch circuits having more stages. The multiband communications apparatus may be used, for instance, in wireless communications equipments such as cell phones, personal computers (PCs), PC peripherals such as printers, hard disk drives, broadband rooters, etc., facsimiles, home electronic appliances such as refrigerators, standard television sets (SDTVs), high-definition television sets (HDTVs), digital cameras, digital videorecorders, etc.

What is claimed is:

1. A multiband high-frequency circuit used between an antenna capable of conducting transmission and reception in at least three communications systems, and transmitting and receiving circuits of at least three communications systems, comprising
a first high-frequency switch circuit for switching the connections of said antenna to first and second paths, a first diplexer circuit disposed in said first path, and a second diplexer circuit disposed in said second path;
each of said first and second diplexer circuits comprising a lower-frequency-side filter circuit and a higher-frequency-side filter circuit;
a path connected to the lower-frequency-side filter circuit of said first diplexer circuit being provided with a bandpass filter circuit, and a second high-frequency switch circuit disposed downstream of said bandpass filter circuit for switching the two-way connection of said bandpass filter circuit to a receiving circuit of the first communications system and a transmitting/receiving circuit of the third communications system;
a path connected to the higher-frequency-side filter circuit of said first diplexer circuit being connected to a receiving circuit of the second communications system;
a path connected to the lower-frequency-side filter circuit of said second diplexer circuit being connected to a transmitting circuit of the first communications system; and
a path connected to the higher-frequency-side filter circuit of said second diplexer circuit being connected to a transmitting circuit of the second communications system.

2. The multiband high-frequency circuit according to claim 1, which comprises a balanced-unbalanced conversion circuit between said second high-frequency switch circuit and the receiving circuit of said first communications system.

3. The multiband high-frequency circuit according to claim 1, which comprises a balanced-unbalanced conversion circuit between said second high-frequency switch circuit and transmitting/receiving circuit of said third communications system.

4. The multiband high-frequency circuit according to claim 1, which comprises a first high-frequency power amplifier in the path connected to the lower-frequency-side filter circuit of said second diplexer circuit, and a second high-frequency power amplifier in the path connected to the higher-frequency-side filter circuit of said second diplexer circuit, said first high-frequency power amplifier being connected to the transmitting circuit of said first communications system, and said second high-frequency power amplifier being connected to the transmitting circuit of said second system.

5. The multiband high-frequency circuit according to claim 1, wherein the path connected to the higher-frequency-side filter circuit of said first diplexer circuit being provided with a low-noise amplifier connected to the receiving circuit of said second communications system.

6. The multiband high-frequency circuit according to claim 1, which comprises a detection circuit between said antenna and said second diplexer circuit.

7. A multiband high-frequency circuit device having the multiband high-frequency circuit recited in claim 1, which comprises a laminate substrate in which pluralities of circuit elements including at least one of line electrodes, capacitor electrodes, ground electrodes and via-holes are formed, circuit elements mounted on said laminate substrate, an antenna terminal, transmitting and receiving terminals of the first communications system, transmitting and receiving terminals of the second communications system, and a transmitting/receiving terminal of the third communications system.

8. The multiband high-frequency circuit device according to claim 7, wherein the diplexer circuit and the bandpass filter circuit are constituted by inductance elements and capacitance elements formed in said laminate substrate.

9. The multiband high-frequency circuit device according to claim 7, wherein the balanced-unbalanced conversion circuit is constituted by inductance elements and capacitance elements formed in said laminate substrate.

10. The multiband high-frequency circuit device according to claim 7, wherein a semiconductor element constituting at least one of the high-frequency switch, the high-frequency power amplifier and the low-noise amplifier is mounted on said laminate substrate.

11. A multiband communications apparatus comprising the multiband high-frequency circuit device recited in claim 7.

* * * * *